US012219552B2

(12) United States Patent
Bar-Or Tillinger et al.

(10) Patent No.: US 12,219,552 B2
(45) Date of Patent: Feb. 4, 2025

(54) SIDELINK CONTROL CHANNEL SUCCESSIVE PARAMETER ESTIMATION

(71) Applicant: QUALCOMM Incorporated, San Diego, CA (US)

(72) Inventors: Amit Bar-Or Tillinger, Tel-Aviv (IL); Michael Levitsky, Rehovot (IL); Assaf Touboul, Netanya (IL); Jacob Pick, Mevaseret Zion (IL); Shmuel Vagner, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 31 days.

(21) Appl. No.: 18/348,254

(22) Filed: Jul. 6, 2023

(65) Prior Publication Data

US 2023/0354307 A1 Nov. 2, 2023

Related U.S. Application Data

(62) Division of application No. 16/883,281, filed on May 26, 2020, now Pat. No. 11,743,884.
(Continued)

(51) Int. Cl.
*H04W 72/1263* (2023.01)
*H04L 5/00* (2006.01)
(Continued)

(52) U.S. Cl.
CPC ....... *H04W 72/1263* (2013.01); *H04L 5/0051* (2013.01); *H04W 4/40* (2018.02);
(Continued)

(58) Field of Classification Search
CPC ... H04W 72/1263; H04W 4/40; H04W 72/02; H04W 72/0446; H04W 72/0453; H04W 72/541; H04W 92/18; H04L 5/0051
See application file for complete search history.

(56) References Cited

U.S. PATENT DOCUMENTS

| 10,448,365 B2 | 10/2019 | Blasco Serrano et al. |
| 2018/0167989 A1 | 6/2018 | Yasukawa et al. |

(Continued)

FOREIGN PATENT DOCUMENTS

| CN | 107925495 A | 4/2018 |
| CN | 109644111 A | 4/2019 |

(Continued)

OTHER PUBLICATIONS

International Preliminary Report on Patentability—PCT/US2020/034653, The International Bureau of WIPO—Geneva, Switzerland, Dec. 9, 2021 (192713WO).
(Continued)

*Primary Examiner* — Chae S Lee
(74) *Attorney, Agent, or Firm* — Holland & Hart LLP

(57) ABSTRACT

Methods, systems, and devices for wireless communications are described. A user equipment (UE) may receive, within a subframe, a plurality of sidelink control channel signals providing scheduling information for a plurality of sidelink shared channel signals that are also received within the subframe. The UE may determine to use one or more of the plurality of sidelink control channel signals as pilot signals for decoding the plurality of sidelink shared channel signals. The UE may decode the plurality of sidelink shared channel signals based at least in part on the plurality of sidelink control channel signals as pilot signals.

20 Claims, 17 Drawing Sheets

Related U.S. Application Data

(60) Provisional application No. 62/855,174, filed on May 31, 2019, provisional application No. 62/855,157, filed on May 31, 2019.

(51) Int. Cl.
*H04W 4/40* (2018.01)
*H04W 72/02* (2009.01)
*H04W 72/0446* (2023.01)
*H04W 72/0453* (2023.01)
*H04W 72/541* (2023.01)
*H04W 92/18* (2009.01)

(52) U.S. Cl.
CPC ....... *H04W 72/02* (2013.01); *H04W 72/0446* (2013.01); *H04W 72/0453* (2013.01); *H04W 72/541* (2023.01); *H04W 92/18* (2013.01)

(56) References Cited

U.S. PATENT DOCUMENTS

| | | |
|---|---|---|
| 2018/0234220 A1 | 8/2018 | Yasukawa et al. |
| 2018/0376471 A1 | 12/2018 | Chae et al. |
| 2019/0053267 A1 | 2/2019 | Kim et al. |
| 2019/0229964 A1 | 7/2019 | Ouchi et al. |
| 2019/0327732 A1* | 10/2019 | Yoon ................. H04W 72/0446 |
| 2020/0059940 A1 | 2/2020 | Wang et al. |
| 2020/0228247 A1 | 7/2020 | Guo et al. |
| 2020/0304159 A1* | 9/2020 | Liao ..................... H04J 11/0036 |
| 2020/0366427 A1 | 11/2020 | Wang et al. |
| 2020/0383130 A1 | 12/2020 | Bar-Or Tillinger et al. |
| 2021/0391894 A1 | 12/2021 | Yu et al. |

FOREIGN PATENT DOCUMENTS

| | | |
|---|---|---|
| CN | 109804682 A | 5/2019 |
| WO | WO-2017171897 A1 | 10/2017 |
| WO | 2020022948 A1 | 1/2020 |

OTHER PUBLICATIONS

International Search Report and Written Opinion—PCT/US2020/034653—ISA/EPO—Oct. 29, 2020 (192713WO).
Partial International Search Report—PCT/US2020/034653—ISAEPO—Sep. 1, 2020 (192713WO).
U.S. Appl. No. 62/855,157, "Sidelink Control Channel Successive Parameter Estimation", Received May 31, 2019, 76 Pages.

* cited by examiner

SIDELINK CONTROL CHANNEL SUCCESSIVE PARAMETER ESTIMATION

CROSS REFERENCE

The present Application for Patent is a divisional of U.S. patent application Ser. No. 16/883,281 by BAR-OR TILLINGER et al., entitled "SIDELINK CONTROL CHANNEL SUCCESSIVE PARAMETER ESTIMATION," filed May 26, 2020, which claims the benefit of U.S. Provisional Patent Application No. 62/855,157 by BAR-OR TILLINGER et al., entitled "SIDELINK CONTROL CHANNEL SUCCESSIVE PARAMETER ESTIMATION," filed May 31, 2019, and the benefit of U.S. Provisional Patent Application No. 62/855,174 by BAR-OR TILLINGER et al., entitled "SIDELINK SHARED CHANNEL SUCCESSIVE LEAKAGE CANCELLATION," filed May 31, 2019, each of which is assigned to the assignee hereof, and each of which is expressly incorporated by reference herein.

BACKGROUND

The following relates generally to wireless communications, and more specifically to sidelink control channel successive parameter estimation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may include or support networks used for vehicle based communications, also referred to as vehicle-to-everything (V2X) networks, vehicle-to-vehicle (V2V) networks, cellular V2X (CV2X) networks, or other similar networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network and/or directly). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged. In some examples, communications in vehicle based networks may include safety message transmissions (e.g., basic safety message (BSM) transmissions, traffic information message (TIM), etc.).

Vehicle based communications may be transmitted over one or more sidelink channels. For example, a physical sidelink control channel (PSCCH) may carry control information (e.g., a grant) scheduling data communications on a physical sidelink shared channel (PSSCH). The PSCCH and PSSCH communications may include one or more pilot signals (e.g., reference signals) used for channel estimation. For example, some symbols within a subframe for a PSCCH communication may carry data (e.g., control information) and other symbols may carry pilot signals (e.g., demodulation reference signal (DMRS)). The receiving device uses the pilot signals to perform channel estimation and then uses the channel estimation for decoding the control information. Similarly, some symbols within a subframe for a PSSCH communication may carry data (e.g., BSM, TIM, etc.) and other symbols may carry pilot signals (e.g., DMRS). The receiving devices uses the pilot signals to perform channel estimation and then uses the channel estimation for decoding the data. However, such techniques may not exploit the fact that both the PSCCH and PSSCH may be transmitted using the same antenna port and/or that these channels use adjacent frequencies.

During CV2X communications, a UE decodes multiple transmissions which are simultaneously generated by different UEs. Each transmission is allocated a bandwidth, where various transmissions may be separated in frequency. However, in some instances, a transmission within an allocated bandwidth may leak into other bandwidths allocated for other transmissions. Under these conditions, the orthogonality of some transmissions' bandwidth allocations may be lost and leakage from a strong transmission may interfere with a weak transmission.

SUMMARY

The described techniques relate to improved methods, systems, devices, and apparatuses that support sidelink control channel successive parameter estimation. Generally, the described techniques provide for techniques that ensure or otherwise improve wireless communications between a transmitting device and the receiving device within a cellular vehicle-to-everything (CV2X) network. Broadly, aspects of the described techniques may include the receiving device (e.g., a user equipment (UE)) operating in a CV2X network reusing data and/or pilot signals in a physical sidelink control channel (PSCCH) in decoding data signals in a physical sidelink shared channel (PSSCH). For example, the UE may receive sidelink control channel signals (e.g., signals received over a PSCCH) that carry or otherwise convey scheduling information for a plurality of sidelink shared channel signals (e.g., signals received over a PSSCH). The UE may determine to use some or all of the sidelink control channel signals as pilot signals for decoding the some or all of sidelink shared channel signals. Accordingly, the UE may decode some or all of the sidelink shared channel signals using the sidelink control channel signals as pilot signals. In some aspects, the sidelink control channel signals may be encoded sidelink control channel signals. Accordingly, in some aspects, the UE may decode some or all of the sidelink control channel signals and then re-encode those sidelink control channel signals that were successfully decoded, such that the re-encoded sidelink control channel signals may be used as pilot signals. Accordingly, the UE may determine sidelink control channel parameters of the sidelink control channels (e.g., a first set of parameters associated with PSCCH) by comparing the encoded sidelink control channel signals with the re-encoded sidelink control channel signals. The UE may decode the sidelink shared channel signals based, at least in some aspects, on the channel parameters determined based on the comparison.

In some aspects, the described techniques relate to improved methods, systems, devices, and apparatuses that support sidelink shared channel successive leakage cancellation. Generally, the described techniques provide for techniques that ensure or otherwise improve wireless communications between a transmitting device and the receiving device within a CV2X network. Broadly, aspects of the described techniques may include the receiving device (e.g., a UE) operating in a CV2X network determining an interfering signal from a set of CV2X transmissions, where the interfering signal interferes with an additional concurrently received CV2X transmission (e.g., a victim transmission, or a transmission from a victim UE). The receiving UE may perform an interference canceling procedure to cancel at least a portion of the leaking interfering signal from the additional received CV2X transmission. The UE may then decode data signals from the victim UE based on the interference canceling procedure.

A method of wireless communication at a UE is described. The method may include receiving, within a subframe, a set of sidelink control channel signals providing scheduling information for a set of sidelink shared channel signals that are also received within the subframe, determining to use one or more of the set of sidelink control channel signals as pilot signals for decoding the set of sidelink shared channel signals, and decoding the set of sidelink shared channel signals based on the set of sidelink control channel signals as pilot signals.

An apparatus for wireless communication at a UE is described. The apparatus may include a processor, memory coupled with the processor, and instructions stored in the memory. The instructions may be executable by the processor to cause the apparatus to receive, within a subframe, a set of sidelink control channel signals providing scheduling information for a set of sidelink shared channel signals that are also received within the subframe, determine to use one or more of the set of sidelink control channel signals as pilot signals for decoding the set of sidelink shared channel signals, and decode the set of sidelink shared channel signals based on the set of sidelink control channel signals as pilot signals.

Another apparatus for wireless communication at a UE is described. The apparatus may include means for receiving, within a subframe, a set of sidelink control channel signals providing scheduling information for a set of sidelink shared channel signals that are also received within the subframe, determining to use one or more of the set of sidelink control channel signals as pilot signals for decoding the set of sidelink shared channel signals, and decoding the set of sidelink shared channel signals based on the set of sidelink control channel signals as pilot signals.

A non-transitory computer-readable medium storing code for wireless communication at a UE is described. The code may include instructions executable by a processor to receive, within a subframe, a set of sidelink control channel signals providing scheduling information for a set of sidelink shared channel signals that are also received within the subframe, determine to use one or more of the set of sidelink control channel signals as pilot signals for decoding the set of sidelink shared channel signals, and decode the set of sidelink shared channel signals based on the set of sidelink control channel signals as pilot signals.

In some examples of the method, apparatuses, and non-transitory computer-readable medium described herein, determining to use one or more of the sidelink control channel signals as pilot signals may include operations, features, means, or instructions for determining that a previous attempt to decode at least one of the set of sidelink shared channel signals was unsuccessful.

Some examples of the method, apparatuses, and non-transitory computer-readable medium described herein may further include operations, features, means, or instructions for decoding one or more of the encoded sidelink control channel signals as one or more decoded sidelink control channel signals, re-encoding, based on the determining, the one or more decoded sidelink control channel signals as one or more re-encoded sidelink control channel signals, and determining a first set of parameters associated with the one or more of sidelink control channels on which the encoded sidelink control channel signals may be received, the first set of parameters determined based on a comparison of the one or more encoded sidelink control channel signals and the one or more re-encoded sidelink control channel signals, where the first set of parameters may be used in the decoding of the set of sidelink shared channel signals.

In some examples of the method, apparatuses, and non-transitory computer-readable medium described herein, decoding the set of sidelink shared channel signals may include operations, features, means, or instructions for refraining from determining a second set of parameters based on sidelink shared channel pilot signals for a set of sidelink shared channels on which the set of sidelink shared channel signals may be received, and using the first set of parameters as estimated channel parameters in decoding the set of sidelink shared channel signals.

In some examples of the method, apparatuses, and non-transitory computer-readable medium described herein, decoding the set of sidelink shared channel signals may include operations, features, means, or instructions for determining a second set of parameters based on sidelink shared channel pilot signals for a set of sidelink shared channels on which the set of sidelink shared channel signals may be received, using the first set of parameters as course channel parameters in a first step of decoding the set of sidelink shared channel signals, and using the second set of parameters in a second step of decoding the set of sidelink shared channel signals.

In some examples of the method, apparatuses, and non-transitory computer-readable medium described herein, decoding the set of sidelink shared channel signals may include operations, features, means, or instructions for determining a second set of parameters based on sidelink shared channel pilot signals for a set of sidelink shared channels on which the set of sidelink shared channel signals may be received, determining jointly estimated channel parameters based on the first set of parameters and the second set of parameters, and using the determined jointly estimated channel parameters in decoding the set of sidelink shared channel signals.

In some examples of the method, apparatuses, and non-transitory computer-readable medium described herein, the first set of parameters includes at least one of a frequency offset, or a timing offset, or a Doppler spread, or a delay spread, or a noise covariance estimation, or a channel response estimation, or a combination thereof.

In some examples of the method, apparatuses, and non-transitory computer-readable medium described herein, decoding one or more of the set of encoded sidelink control channel signals as one or more decoded sidelink control channel signals further may include operations, features, means, or instructions for verifying that each of the one or more decoded sidelink control channel signals passes a cyclic redundancy check.

In some examples of the method, apparatuses, and non-transitory computer-readable medium described herein, determining to use one or more of the sidelink control channel signals as pilot signals may include operations, features, means, or instructions for identifying that at least one of the set of sidelink control channel signals and at least one of the set of sidelink shared channel signals may be transmitted using a same antenna port.

In some examples of the method, apparatuses, and non-transitory computer-readable medium described herein, determining to use one or more of the sidelink control channel signals as pilot signals may include operations, features, means, or instructions for identifying that at least one of the set of sidelink control channel signals and at least one of the set of sidelink shared channel signals may be transmitted on adjacent frequencies.

In some examples of the method, apparatuses, and non-transitory computer-readable medium described herein, the set of sidelink control channel signals and the set of sidelink shared channel signals may be CV2X signals.

In some examples of the method, apparatuses, and non-transitory computer-readable medium described herein, the set of sidelink control channel signals may be PSCCH signals and the set of sidelink shared channel signals may be PSSCH signals.

A method of wireless communication at a UE is described. The method may include receiving, from a first wireless device and within a subframe, a first set of sidelink control channel signals providing scheduling information for a first set of sidelink shared channel signals that are received within a first set of subcarriers of the subframe, determining that at least one of a second set of sidelink control channel signals or a second set of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers, performing an interference canceling procedure in order to cancel at least a portion of the interfering signal portion on one or more subcarriers in the second set of subcarriers that are within the first set of subcarriers of the subframe, and decoding the first set of sidelink shared channel signals after the interference canceling procedure.

An apparatus for wireless communication at a UE is described. The apparatus may include a processor, memory coupled with the processor, and instructions stored in the memory. The instructions may be executable by the processor to cause the apparatus to receive, from a first wireless device and within a subframe, a first set of sidelink control channel signals providing scheduling information for a first set of sidelink shared channel signals that are received within a first set of subcarriers of the subframe, determine that at least one of a second set of sidelink control channel signals or a second set of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers, perform an interference canceling procedure in order to cancel at least a portion of the interfering signal portion on one or more subcarriers in the second set of subcarriers that are within the first set of subcarriers of the subframe, and decode the first set of sidelink shared channel signals after the interference canceling procedure.

Another apparatus for wireless communication at a UE is described. The apparatus may include means for receiving, from a first wireless device and within a subframe, a first set of sidelink control channel signals providing scheduling information for a first set of sidelink shared channel signals that are received within a first set of subcarriers of the subframe, determining that at least one of a second set of sidelink control channel signals or a second set of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers, performing an interference canceling procedure in order to cancel at least a portion of the interfering signal portion on one or more subcarriers in the second set of subcarriers that are within the first set of subcarriers of the subframe, and decoding the first set of sidelink shared channel signals after the interference canceling procedure.

A non-transitory computer-readable medium storing code for wireless communication at a UE is described. The code may include instructions executable by a processor to receive, from a first wireless device and within a subframe, a first set of sidelink control channel signals providing scheduling information for a first set of sidelink shared channel signals that are received within a first set of subcarriers of the subframe, determine that at least one of a second set of sidelink control channel signals or a second set of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers, perform an interference canceling procedure in order to cancel at least a portion of the interfering signal portion on one or more subcarriers in the second set of subcarriers that are within the first set of subcarriers of the subframe, and decode the first set of sidelink shared channel signals after the interference canceling procedure.

In some examples of the method, apparatuses, and non-transitory computer-readable medium described herein, determining that at least one of the second set of sidelink control channel signals or the second set of sidelink shared channel signals may be an interfering signal may include operations, features, means, or instructions for decoding the first set of sidelink control channel signals as first decoded sidelink control channel signals and the second set of sidelink control channel signals as second decoded sidelink control channel signals, where the determining may be based on the first decoded sidelink control channel signals and the second decoded sidelink control channel signals.

In some examples of the method, apparatuses, and non-transitory computer-readable medium described herein, determining that at least one of the second set of sidelink control channel signals or the second set of sidelink shared channel signals may be an interfering signal further may include operations, features, means, or instructions for identifying that the interfering signal portion of the one or more subcarriers in the second set of sidelink control channel signals or second set of sidelink shared channel signals exceeds a predetermined signal strength threshold within the first set of subcarriers associated with the first plurality of sidelink shared channel signals.

In some examples of the method, apparatuses, and non-transitory computer-readable medium described herein, determining that at least one of the second set of sidelink control channel signals or the second set of sidelink shared channel signals may be an interfering signal further may include operations, features, means, or instructions for identifying that the first plurality of sidelink shared channel signals received within the first set of subcarriers and the second plurality of sidelink control channel signals or the second plurality of sidelink shared channel signals received within the second set of subcarriers may be within a threshold frequency offset of each other.

In some examples of the method, apparatuses, and non-transitory computer-readable medium described herein, determining that at least one of the second set of sidelink control channel signals or the second set of sidelink shared channel signals may be an interfering signal further may include operations, features, means, or instructions for identifying that the first plurality of sidelink shared channel signals received within the first set of subcarriers and the second plurality of sidelink control channel signals or the second plurality of sidelink shared channel signals received within the second set of subcarriers may be adjacent to each other.

In some examples of the method, apparatuses, and non-transitory computer-readable medium described herein, determining that at least one of the second set of sidelink control channel signals or the second set of sidelink shared channel signals may be an interfering signal further may include operations, features, means, or instructions for identifying relative frequency domain positions of the first plurality of sidelink shared channel signals received within the first set of subcarriers and the second plurality of sidelink control channel signals or the second plurality of sidelink shared channel signals received within the second set of subcarriers.

In some examples of the method, apparatuses, and non-transitory computer-readable medium described herein, determining that at least one of the second set of sidelink control channel signals or the second set of sidelink shared channel signals may be an interfering signal further may include operations, features, means, or instructions for identifying at least one of a modulation and coding scheme, a retransmission policy, or an allocation size and position of the first set of sidelink shared channel signals from the first decoded sidelink control channel signals, and determining that the first set of sidelink shared channel signals may be subject to interference by the at least one of the second set of sidelink control channel signals or second set of sidelink shared channel signals based on the modulation and coding scheme, the retransmission policy, or the allocation size and position of the first set of sidelink shared channel signals.

In some examples of the method, apparatuses, and non-transitory computer-readable medium described herein, determining that at least one of the second set of sidelink control channel signals or the second set of sidelink shared channel signals may be an interfering signal further may include operations, features, means, or instructions for determining at least one of an estimated received power, an estimated signal-to-noise ratio, or an estimated frequency offset of the first set of sidelink shared channel signals based on a corresponding measured received power, a corresponding measured signal-to-noise ratio, or a corresponding measured frequency offset of the first decoded sidelink control channel signals, and determining that the first set of sidelink shared channel signals may be subject to interference by the at least one of the second set of sidelink control channel signals or second set of sidelink shared channel signals based on the estimated received power, the estimated signal-to-noise ratio, or the estimated frequency offset of the first set of sidelink shared channel signals.

In some examples of the method, apparatuses, and non-transitory computer-readable medium described herein, decoding the first set of sidelink control channel signals and the second set of sidelink control channel signals may include operations, features, means, or instructions for verifying that each of the first set of sidelink control channel signals and the second set of sidelink control channel signals passes a cyclic redundancy check.

In some examples of the method, apparatuses, and non-transitory computer-readable medium described herein, performing the interference canceling procedure may include operations, features, means, or instructions for re-encoding the interfering signal, where the interference canceling procedure uses the re-encoded interfering signal to cancel at least the portion of the interfering signal portion within the first set of subcarriers of the subframe.

In some examples of the method, apparatuses, and non-transitory computer-readable medium described herein, performing the interference canceling procedure may include operations, features, means, or instructions for canceling at least a portion of frequency leakage in the first plurality of sidelink shared channel signals received within the first set of subcarriers of the subframe from at least one of the second set of sidelink control channel signals or the second set of sidelink shared channel signals.

Some examples of the method, apparatuses, and non-transitory computer-readable medium described herein may further include operations, features, means, or instructions for identifying that the interfering signal may be a compound of the at least one of the second set of sidelink control channel signals or second set of sidelink shared channel signals and at least one of a synchronization signal, a feedback signal, or a channel state information reference signal.

In some examples of the method, apparatuses, and non-transitory computer-readable medium described herein, the set of first sidelink control channel signals, the set of first sidelink shared channel signals, the set of second sidelink control channel signals, and the set of second sidelink shared channel signals are CV2X signals.

In some examples of the method, apparatuses, and non-transitory computer-readable medium described herein, the first set of sidelink control channel signals and the second set of sidelink control channel signals may be physical sidelink control channel (PSCCH) signals and the first set of sidelink shared channel signals and the second set of sidelink shared channel signals may be physical sidelink shared channel (PSSCH) signals.

In some examples of the method, apparatuses, and non-transitory computer-readable medium described herein, the wireless communication occurs on a mmW system or a sub-6 GHz system.

DETAILED DESCRIPTION

Figure 1:
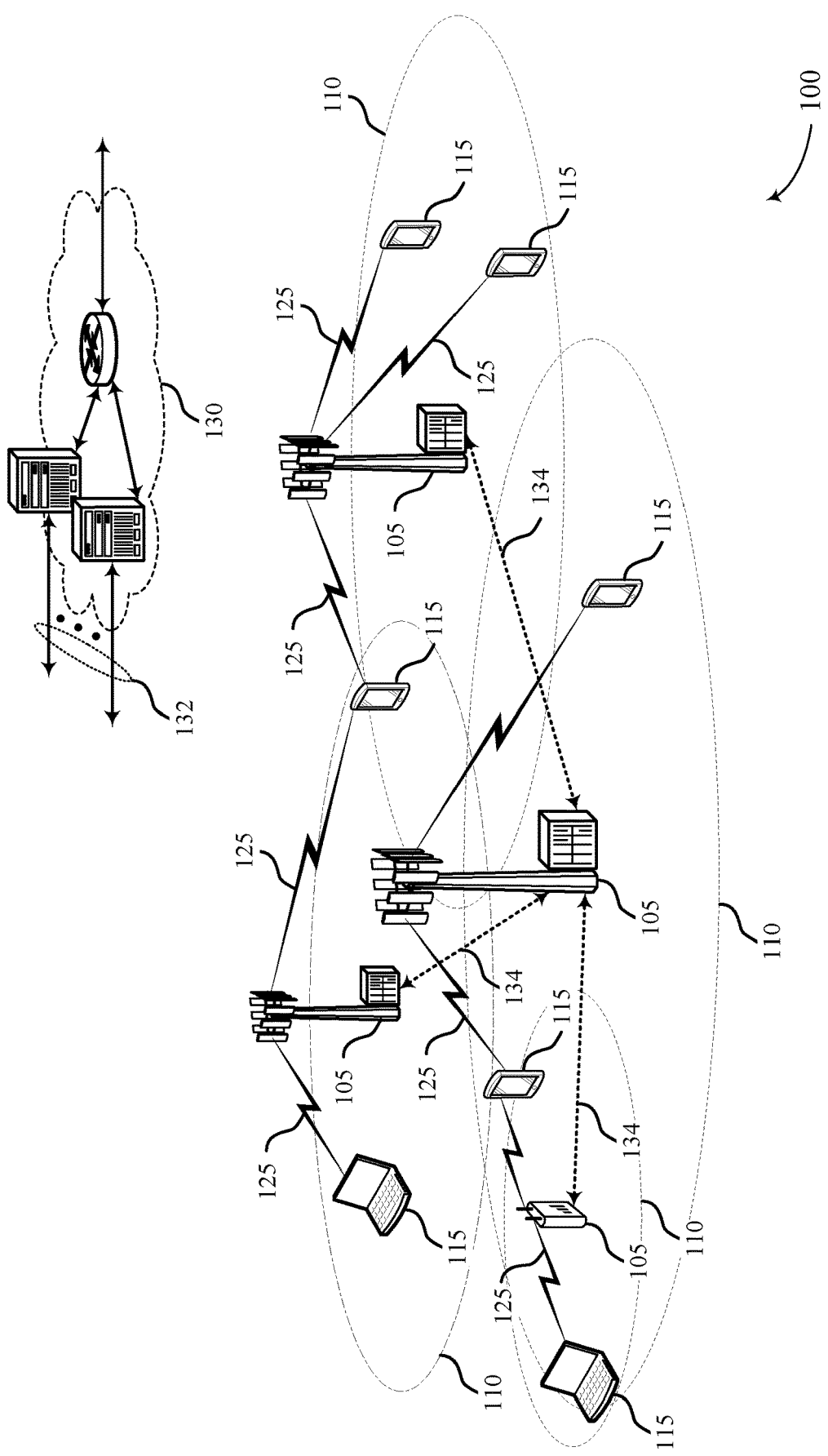
FIG. 1 illustrates an example of a system for wireless communications that supports sidelink control channel successive parameter estimation in accordance with aspects of the present disclosure.

A wireless multiple-access communications system may include a number of base stations or network access nodes, each simultaneously supporting communication for multiple communication devices, which may be otherwise known as user equipment (UE). Some wireless networks may support vehicle based communications, such as vehicle-to-everything (V2X) networks, vehicle-to-vehicle (V2V) networks, cellular V2X (CV2X) networks, or other similar networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network and/or directly). Communications within a vehicle based network may be performed using signals communicated over sidelink channels, such as a physical sidelink control channel (PSCCH) and/or a physical sidelink shared channel (PSSCH). For example, PSCCH may carry control information (e.g., a grant) scheduling data communications on a PSSCH. Typically, each sidelink channel may be used to transmit information as well as pilot signals (such as a demodulation reference signal (DMRS)). The pilot signals may be used to decode the information communicated on the corresponding channel. However, such techniques may not take advantage of the nature of communications within a CV2X network.

In V2V networks, a UE may receive transmissions from multiple UEs. Receiving transmissions from multiple UEs requires different receive power and different frequency offset between the various transmissions. Since a PSCCH signal is more robust than a PSSCH signal, the PSCCH signal is more likely to pass an error check in the presence of leakage from interfering transmissions with adjacent frequency allocations, while the PSSCH may not. In addition, the nature of communications within a CV2X network may allow for additional uses of a PSCCH signal. For example, because both a PSCCH and a PSSCH signal may be transmitted using the same antenna port and with adjacent frequencies, the ratio of received power as well as the frequency offset between the PSCCH signals of two different allocations can be used as a good prediction for the ratio of their corresponding PSSCH signals. Additionally, aspects of the described techniques may take advantage of the fact that the estimated channel parameters of a PSCCH signal are likely similar to the estimated channel parameters of a corresponding PSSCH signal, which means that the channel parameter estimation during the PSSCH decoding stage may make use of the channel estimations of the PSCCH decoding stage. This may lead to techniques for dynamically reducing the leakage of an interfering transmission.

Aspects of the disclosure are initially described in the context of a wireless communications system, such as a vehicle based wireless network. Aspects of the disclosure provide for a receiving device (e.g., a UE operating in a CV2X network) to use PSCCH signal(s) for channel estimation(s) in decoding PSSCH signal(s). For example, the UE may, within a subframe, receive PSCCH signal(s) scheduling information for PSSCH signal(s). The UE may determine to use at least one of the PSCCH signal(s) as pilot signals for decoding the PSSCH signal(s), and therefore decode the PSSCH signal(s) based, at least in some aspects, on the PSCCH signal(s). For example, the PSCCH signal(s) may be encoded PSCCH signal(s). The UE may identify which of the PSCCH signal(s) have been decoded (e.g., cyclic redundancy check (CRC) has passed successfully), and re-encode the decoded PSCCH signal(s). The UE may determine the channel parameters (e.g., the first set of parameters associated with PSCCH) for the re-encoded PSCCH signal(s) by comparing the original (e.g., the encoded) PSCCH signal(s) with the re-encoded PSCCH signal(s). Based on this comparison, the UE may decode the PSSCH signal(s). That is, the UE may use the first set of parameters of the re-encoded PSCCH signal(s) in decoding the PSSCH signal(s).

Aspects of the disclosure are initially described in the context of a wireless communications system. Aspects of the disclosure are further illustrated by and described with reference to apparatus diagrams, system diagrams, and flowcharts that relate to sidelink control channel successive parameter estimation.

FIG. 1 illustrates an example of a wireless communications system 100 that supports sidelink control channel successive parameter estimation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may receive, within a subframe, a plurality of sidelink control channel signals providing scheduling information for a plurality of sidelink shared channel signals that are also received within the subframe. The UE 115 may determine to use one or more of the plurality of sidelink control channel signals as pilot signals for decoding the plurality of sidelink shared channel signals. The UE 115 may decode the plurality of sidelink shared channel signals based at least in part on the plurality of sidelink control channel signals as pilot signals.

In some aspects, a UE 115 may receive, within a subframe, a plurality of sidelink control channel signals providing scheduling information for a plurality of sidelink shared channel signals that are also received within the subframe. The UE 115 may determine that at least one of a plurality of sidelink control channel signals or sidelink shared channel signals is an interfering signal. Upon determining the interfering signal(s), the UE 115 may perform an interference canceling procedure to cancel at least a portion of the interfering signal. In particular, the portion of the interfering signal that overlaps into a bandwidth allocated for a victim signal is canceled or otherwise mitigated. The UE 115 may then decode another plurality of sidelink control channel signals received in the bandwidth in which the portion of the interfering signal was canceled, after the interference canceling procedure.

Figure 2:
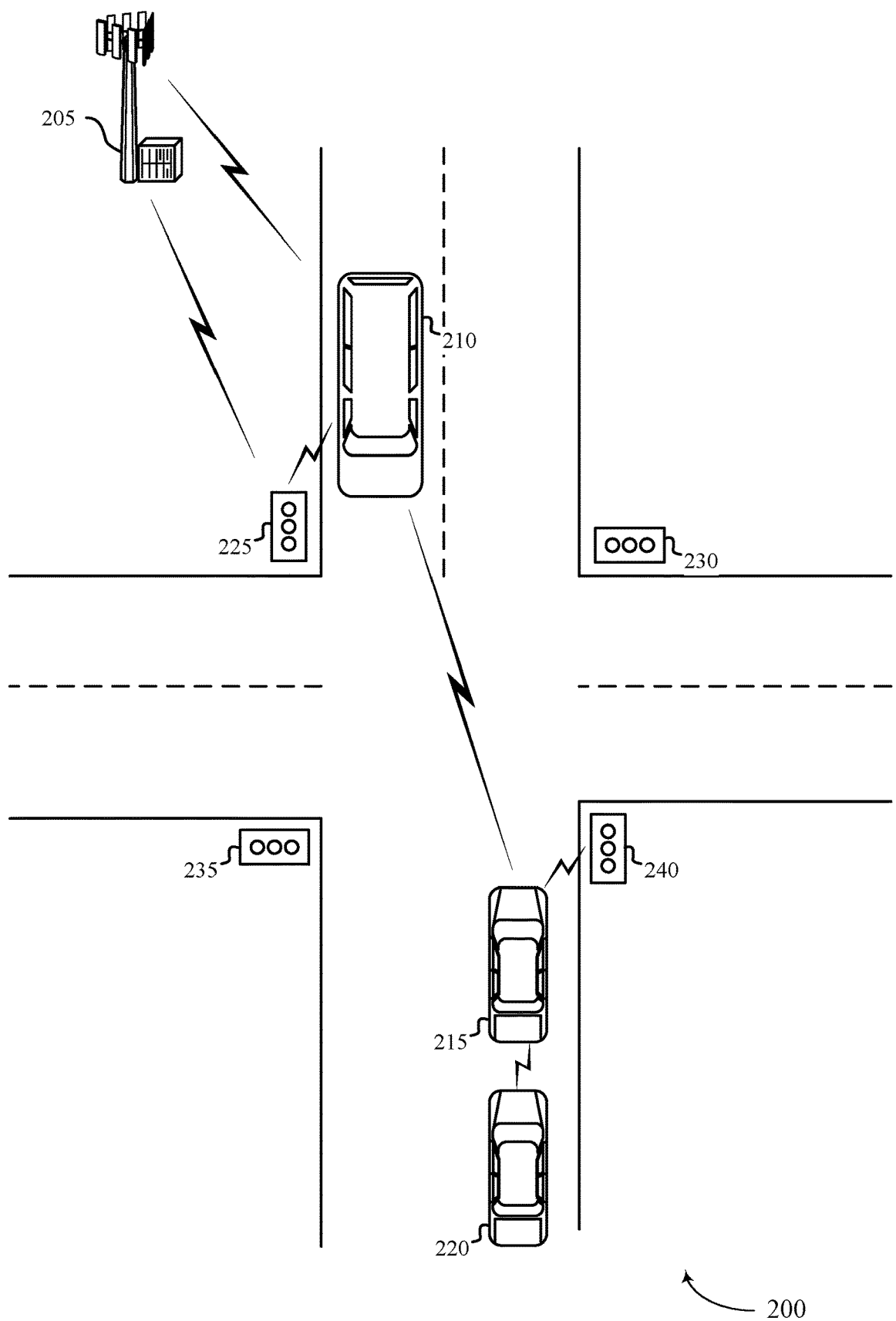
FIG. 2 illustrates an example of a wireless communication system that supports sidelink control channel successive parameter estimation in accordance with aspects of the present disclosure.

FIG. 2 illustrates an example of a wireless communication system 200 that supports sidelink control channel successive parameter estimation in accordance with aspects of the present disclosure. In some examples, wireless communication system 200 may implement aspects of wireless communication system 100. Aspects of wireless communication system 200 may be implemented by a base station 205, a vehicle 210, a vehicle 215, a vehicle 220, a traffic light 225, a traffic light 230, a traffic light 235, and/or a traffic light 240. In some aspects, one or more of the traffic lights 225-240 may be examples of roadside units (RSUs) communicating in wireless communication system 200.

In some aspects, wireless communication system 200 may support vehicle safety and operational management, such as a CV2X network. Accordingly, one or more of the vehicles 210-220 and/or traffic lights 225-240 may be considered as UEs within the context of the CV2X network. For example, one or more of the vehicles 210-220 and/or traffic lights 225-240 may be equipped or otherwise configured to operate as a UE performing wireless communications over the CV2X network. In some aspects, the CV2X communications may be performed directly between base station 205 and one or more of the vehicles 210-220 and/or traffic lights 225-240, or indirectly via one or more hops. For example, vehicle 215 may communicate with base station 205 via one hop through vehicle 210, traffic light 240, or any other number/configuration of hop(s). In some aspects, the CV2X communications may include communicating control signals (e.g., one or more PSCCH signals) and data signals (e.g., one or more PSSCH signals).

In some aspects, each UE of wireless communication system 200 (e.g., vehicles 210-220 and/or traffic lights 225-240) may be configured with a resource allocation for performing CV2X communications. For example, each UE may be configured with a set of frequencies or subcarriers that are allocated for monitoring and receiving control signals (e.g., both data signals and pilot signals received over a PSCCH) within a subframe. In some aspects, each UE may also be configured with the set of frequencies or subcarriers that are allocated for monitoring and receiving data signals (e.g., both data signals and pilot signals received over a PSSCH) within the subframe.

According to some techniques, receiving CV2X communications may be performed by decoding the PSCCH signals first and, based on the decoded PSCCH signals, decoding the PSSCH signals next. In some aspects, V2V communications may be one of the main CV2X applications. In the V2V context, reception may be high speed with a low signal-to-noise ratio (SNR) being required. In these conditions, the accuracy of the channel parameters estimation (e.g., timing offset, frequency offset, channel response, noise power, delay spread, Doppler spread, etc.) may be expected to be low, which may dictate the overall reception performance.

For example, with respect to the PSSCH reception, the transmission of PSCCH signals within the CV2X network may have certain advantages. Some advantages may include signal robustness. For example, the PSSCH signal coding rate may be low (e.g., 0.1) and transmitted using a quadrature phase shift keying (QPSK) constellation. Another example may include the PSSCH signal coding rate being variable (e.g., may reach close to one) and being transmitted using a 64 quadrature amplitude modulated (QAM) constellation. Since CV2X communications may not use channel state information (CSI) feedback, the PSSCH transmission parameters may not be optimized according to fading channel conditions. Another advantage may include power boosting where the PSCCH energy spectral density may be higher than the PSSCH energy spectral density, e.g., 3 dB higher. As discussed, some techniques for PSCCH signal decoding may use the dedicated PSCCH signals for channel estimation. If the PSCCH signal was successfully detected and correctly decoded (e.g., the CRC passed), the PSSCH signal decoding is attempted using the dedicated PSSCH pilot signals for parameter estimation. However, such techniques do not take advantage of the nature and/or configuration of CV2X network communications.

Moreover, such techniques may not take advantage of the fact that both the control and the shared channels (e.g., PSCCH and PSSCH) may be transmitted using the same antenna port and/or that these channels are transmitted using adjacent frequencies (in most scenarios). Under these conditions, aspects of the described techniques may take advantage of the fact that the estimated channel parameters should be similar, which means that the channel parameter estimation during the PSSCH decoding stage may make use of the channel estimations of the PSCCH decoding stage.

In addition, since PSSCH signal decoding is attempted if PSCCH signal decoding is successful (e.g., CRC passes), the PSCCH signals can be re-encoded and used entirely (e.g., both data and pilot signals) as pilot signals for re-estimation of the channel parameters (e.g., a first set of parameters associated with PSCCH) prior to the PSSCH decoding attempt. Aspects of the described techniques may include a variety of options for using the PSCCH channel parameter (e.g., the first set of parameters) estimation during the PSSCH signal decoding stage. In some aspects, these options may correspond to different trade-offs for channel parameter estimation quality vs. complexity. A first option may include using the PSCCH estimated channel parameters (e.g., the first set of parameters) directly (e.g., lowest quality, lowest complexity) in PSSCH decoding. A second option may include using the PSCCH estimated channel parameters (e.g., the first set of parameters) as a course estimation, which is refined using PSSCH pilot signals-based estimations (e.g., a second set of parameters associated with PSSCH) for PSSCH decoding (medium quality, medium complexity). A third option may include using PSCCH and PSSCH pilot signals jointly for channel parameter estimation (e.g., both the first and second sets of parameters associated with PSCCH and PSSCH, respectively) during PSSCH decoding (highest quality, highest complexity). Examples of the parameters in the first and/or second sets of parameters include, but are not limited to, a frequency offset, a timing offset, a Doppler spread, a delay spread, a noise covariance estimation, and/or a channel response estimation.

In some aspects, implementing the described techniques may result in certain gains. One example may include a multiple of three (×3) processing gain, e.g., as there may be up to eight data symbols on top of the four pilot symbols within a subframe. Another gain may be up to a 3 dB processing gain of energy spectral density as compared to PSSCH. Another gain may include up to ×3 granularity in the time domain, e.g., which may better handle high-speed scenarios. In some scenarios, the PSSCH part of an allocation for a UE (which may have a flexible size in the frequency domain) may partially overlap with the PSCCH allocation, with the control part having a lower probability of collision.

Accordingly, aspects of the described techniques may include one or more of the UEs of wireless communication system 200 (e.g., vehicles 210-220 and/or traffic lights 225-240) receiving, within a subframe, a plurality of PSCCH signals that provide or otherwise convey scheduling information (e.g., grants) for a plurality of PSSCH signals within the subframe.

In some aspects, the UE may determine to use one or more of the PSCCH signals as pilot signals for decoding the plurality of PSSCH signals. In some aspects, the UE may determine to use one or more of the PSCCH signals as pilot signals based on selecting one or more of the trade-offs discussed above, e.g., by selecting a corresponding quality/complexity metric to implement for the CV2X communications. In some aspects, the UE may determine to use one or more of the PSCCH signals as pilot signals based on a previous failed decoding attempt. For example, the UE may determine to use one or more of the PSCCH signals as pilot signals based on a previous attempt to decode at least one of the PSSCH signals being unsuccessful. In some aspects, the UE may determine to use one or more of the PSCCH signals as pilot signals based on determining that the PSCCH signals and the PSSCH signals are transmitted using the same antenna port and/or on adjacent frequencies/subcarriers.

In some aspects, this may include the UE decoding the encoded PSCCH signals. As discussed, a PSCCH signal may be decoded upon passage of the CRC. Based on the determination to use the PSCCH signals as pilot signals and decoding the PSCCH signals, the UE may re-encode the decoded PSCCH signals. The UE may compare the encoded PSCCH signals with the re-encoded PSCCH signals to determine the channel parameters (e.g., the first set of parameters, which may also be referred to as channel parameter estimation, parameters estimation, etc.) to use in decoding the PSSCH signals.

The first option for using PSCCH channel parameter estimation (e.g., the first set of parameters) during the PSSCH signal decoding stage may include the UE refraining from determining channel parameters based on the PSSCH signals (e.g., the second set of parameters) and, instead, using the channel parameters of the PSCCH signals in decoding the PSSCH signals. The second option for using PSCCH channel parameter estimation during the PSSCH signal decoding stage may include the UE determining the channel parameters for the PSSCH pilot signals (e.g., the second set of parameters). The UE may use the channel parameters for the PSCCH signals as course channel parameters in the first step of decoding the PSSCH signals and then use the channel parameters for the PSSCH pilot signals (e.g., the second set of parameters) in the next step of decoding the PSSCH signals.

The third option for using PSCCH channel parameter estimation during the PSSCH signal decoding stage may include the UE determining channel parameters for the PSSCH pilot signals (e.g., the second set of parameters associated with PSSCH). For example, the UE may determine jointly estimated channel parameters based on the channel parameters of the PSCCH signals (e.g., the first set of parameters) and the channel parameters of the PSSCH pilot signals. The UE may use the jointly estimated channel parameters in decoding the PSSCH signals. Accordingly, the UE may leverage the channel parameters determined based, at least in some aspects, on the PSCCH signals (both data or information signals and/or pilot signals) in decoding the PSSCH signals within the subframe.

Thus, the UE may dynamically decide, for each PSSCH allocation, how to use the PSCCH channel parameters in decoding PSSCH signals. In some aspects, this may include the UE attempting to decode all possible PSCCH signals using PSCCH pilot signals for channel parameter estimation. For each correctly decoded PSCCH signal (e.g., CRC passes), the UE may attempt to decode the PSSCH allocation using PSSCH pilot signals for channel parameter estimation. For some or all of the failed PSSCH signal decoding attempts (e.g., CRC fails), the UE may re-encode the PSCCH signals (e.g., use the entire PSCCH signal as pilot signals), estimate the channel parameters (e.g., selecting one of the three estimation options according to the most appropriate quality versus complexity trade-off), and then decode PSSCH signals using the channel parameters determined based on the re-encoded PSCCH signals.

Accordingly, aspects of the described techniques may improve overall reception quality and provide an intelligent balance of receiver complexity. For example, aspects of the described techniques may reduce complexity (e.g. when not required) for the reception of some PSSCH signal allocations, while increasing the complexity for other PSSCH signal allocations in the situation where PSSCH signal decoding is less likely to be successful.

Figure 3:
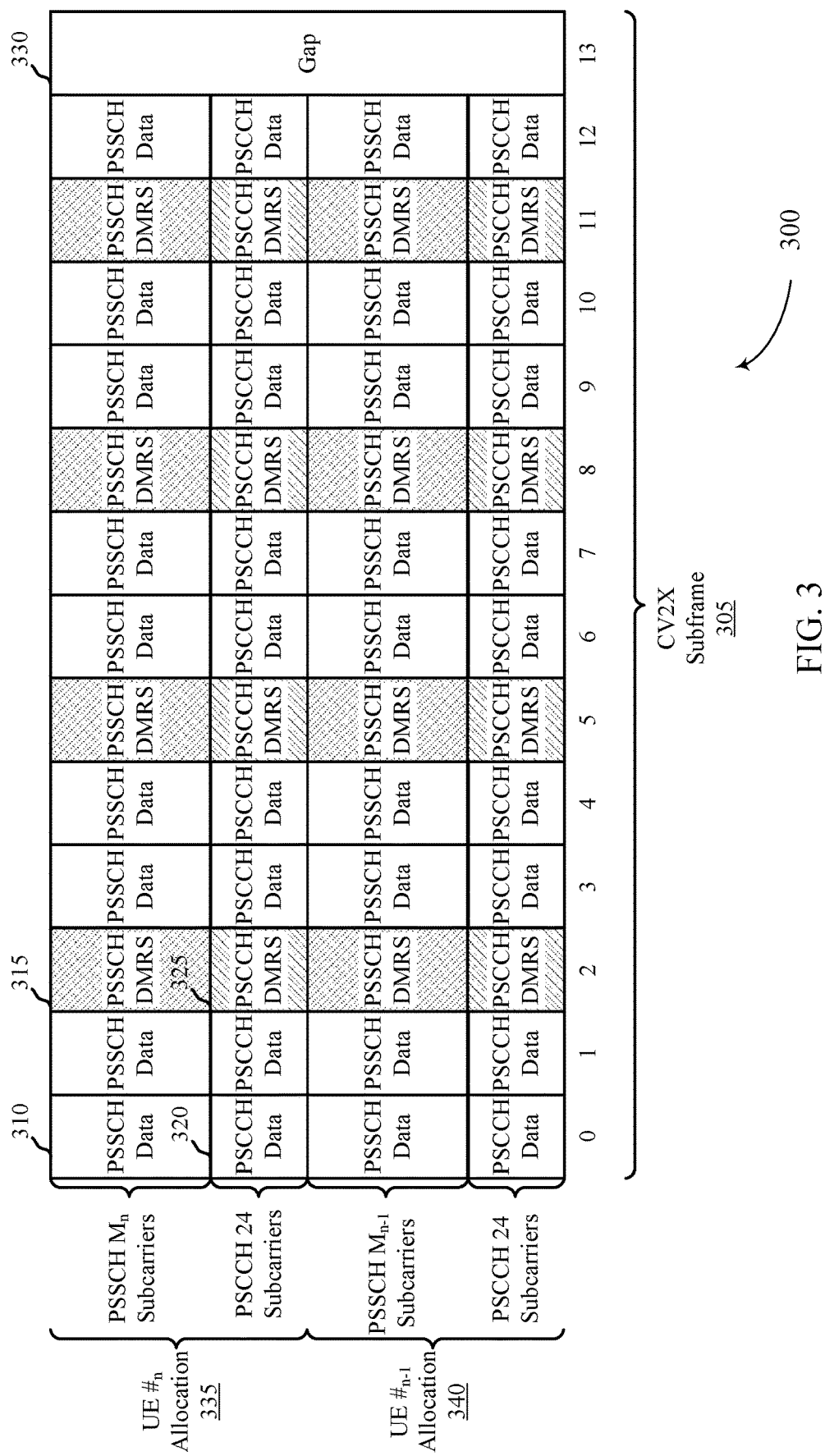
FIG. 3 illustrates an example of a cellular vehicle-to-everything (CV2X) subframe that supports sidelink control channel successive parameter estimation in accordance with aspects of the present disclosure.

FIG. 3 illustrates an example of a CV2X subframe 300 that supports sidelink control channel successive parameter estimation in accordance with aspects of the present disclosure. In some examples, CV2X subframe 300 may implement aspects of wireless communication systems 100 and/or 200. Aspects of CV2X subframe 305 may be implemented by a UE, which may be an example of the corresponding devices described herein.

Generally, aspects of CV2X subframe 305 may be implemented in a wireless multiple-access communications system, such as a CV2X network. For example, the CV2X network may include one or more UEs (with two UEs being shown by way of example only) being configured with an allocation of resources for performing CV2X communications. In some aspects, the configured resources may include a plurality of PSSCH data signals 310 and PSSCH pilot signals 315 (e.g., DMRS) as well as a plurality of PSCCH data signals 320 (e.g., control signals) and PSCCH pilot signals 325 (e.g., DMRS). In some aspects, each UE may have a corresponding allocation of such resources during some or all of the symbols of CV2X subframe 305 (with CV2X subframe 305 shown with 14 symbols by way of example only). In some aspects, CV2X subframe 305 may include one or more gaps 330, with one gap 330 being shown by way of example only.

As discussed, UEs operating within a CV2X network may be configured with resources to use for performing the vehicle based wireless communications. For example, a first UE (e.g., UE #n) may be configured with a first allocation 335 and a second UE (e.g., UE $\#_{n-1}$) may be configured with a second allocation 340. Generally, each of the first allocation 335 and/or the second allocation 340 may include a number of subcarriers used for communicating control information (with 24 PSCCH subcarriers being shown by way of example only) as well as a number of subcarriers used for communicating data information (e.g., with Mn subcarriers being shown by way of example only). In some aspects, the PSCCH subcarriers and the PSSCH subcarriers may be adjacent with respect to each other. In some aspects, the signals transmitted over the PSCCH subcarriers and the PSSCH subcarriers may be transmitted using a common antenna port.

In some aspects, a UE may receive, within CV2X subframe 305, a plurality of PSCCH data signals 320 (which may include a corresponding PSCCH pilot signals 325) that schedule information for the plurality of PSSCH data signals 310. In some aspects, the UE may determine to use one or more of the plurality of PSCCH data signal 320 as pilot signals for decoding the plurality of PSSCH data signals 310. For example, the UE may make this determination based on the PSCCH and PSSCH signals being communicated using the same antenna port, over adjacent frequencies/subcarriers, and the like. In some aspects, the UE may make this determination based on the trade-off between complexity and quality. In some aspects, the UE may make this determination based on a previously unsuccessful attempt to decode some or all of the PSSCH data signals 310.

Accordingly, in some aspects the UE may use the PSCCH pilot signals 325 to determine channel parameters (e.g., the first set of parameters) used to decode the corresponding PSCCH data signals 320. In some aspects, the PSCCH data signals 320 may be considered decoded upon CRC passage. Based on the determination to use the PSCCH data signal 320 as pilot signals in decoding the PSSCH data signals 310, the UE may re-encode some or all of the decoded PSCCH data signals 320. The UE may compare the originally encoded PSCCH signals with the re-encoded PSCCH signals to determine or otherwise derive channel parameters (e.g., the first set of parameters) used for decoding the PSSCH data signals 310. For example, the UE may leverage the information obtained from the successfully decoded PSCCH signals in re-encoding the PSCCH signals to determine the channel parameters for the PSCCH data signals 320.

In some aspects, the UE may decode some or all of the PSSCH data signals 310 using the channel parameters determined based on the comparison of the encoded PSCCH signals and the re-encoded PSCCH signals. The UE may use one of the three options discussed above in decoding the PSSCH data signals 310. For example, the first option may include the UE refraining from determining the channel parameters for the PSSCH using the PSSCH pilot signals 315. Instead, the UE may use the channel parameters determined based on the comparison between the encoded PSCCH signals and the re-encoded PSCCH signals in decoding the PSSCH data signals 310.

In the second option, the UE may use the channel parameters determined based on the comparison between the encoded PSCCH signals and the re-encoded PSCCH signals as course channel parameters in a first step of decoding the PSSCH data signals 310. The UE may determine the channel parameters for the PSSCH based on the PSSCH pilot signals 315, and use these channel parameters as fine channel parameters in the next step of decoding the PSSCH data signals 310. In the third option, the UE may use both the channel parameters determined based on the comparison between the encoded PSCCH signals and the re-encoded PSCCH signals as well as the channel parameters for the PSSCH using the PSSCH pilot signals 315 in decoding the PSSCH data signals 310 (e.g., both the first and second sets of parameters associated with PSCCH and PSSCH, respectively).

Accordingly, the described techniques may support re-encoding the control channel (e.g., the PSCCH data signals 320) and using this to improve reception of the shared channel (e.g., the PSSCH data signals 310). Aspects of the described techniques may allow for improved reception of the PSSCH data signal 310, provide a mechanism to balance between complexity and quality, and the like.

In some aspects, a UE may receive, within CV2X subframe 305 a plurality of PSCCH signals from UE $\#_n$ and a plurality of PSCCH and/or PSSCH signals from UE The UE may determine that at least one of the plurality of PSCCH and/or PSSCH signals from UE $\#_{n-1}$ comprises an interfering signal with respect to the PSSCH signal from UE Based on identifying the interfering signal, the UE may cancel at least a portion of the interfering signal that is within a bandwidth allocated for the PSSCH signals from UE #n, and then decode PSSCH signals from UE $\#_n$. Aspects of the described techniques may allow for improved reception of the PSSCH data signal 310.

Figure 4:
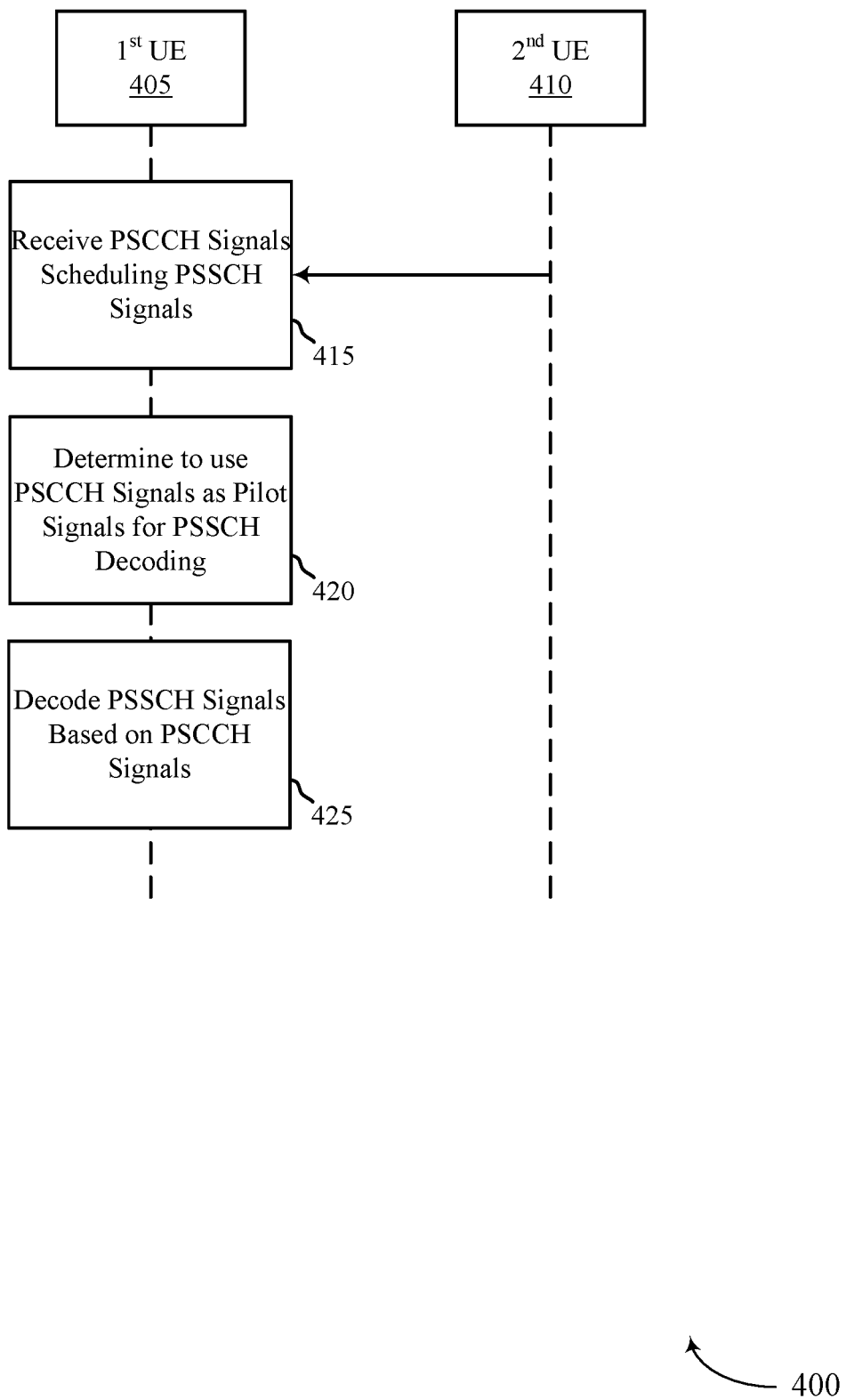
FIG. 4 illustrates an example of a process that supports sidelink control channel successive parameter estimation in accordance with aspects of the present disclosure.

FIG. 4 illustrates an example of a process 400 that supports sidelink control channel successive parameter estimation in accordance with aspects of the present disclosure. In some examples, process 400 may implement aspects of wireless communication systems 100 and/or 200 and/or CV2X subframe 300. Aspects of process 400 may be implemented by a first UE 405 and/or a second UE 410, which may be examples of corresponding devices described herein.

The features of process 400 are generally described as being performed by the first UE 405. However, it is to be understood that these features may be implemented by the second UE 410 and/or by any other UE, node, device, and the like, operating in a CV2X network. For example, the features of process 400 may be implemented by a roadside unit (RSU), a vulnerable road user (VRU), a base station, and the like, performing wireless communications within a CV2X network.

At 415, the first UE 405 may receive, within a subframe, a plurality of sidelink control channel signals (e.g., PSCCH signals) that carry or convey scheduling information for a plurality of sidelink shared channel signals (e.g., PSSCH signals) that are also received within the subframe. For example, the first UE 405 may receive the plurality of sidelink control channel signals from the second UE 410 and/or from any of the UEs, nodes, devices, etc., operating within the CV2X network.

In some aspects, the plurality of sidelink control channel signals and/or the plurality of sidelink shared channel signals may be CV2X signals. For example, the plurality of sidelink control channel signals may be PSCCH signals and the plurality of sidelink shared channel signals may be PSSCH signals.

At 420, the first UE 405 may determine to use one or more of the plurality of sidelink control channel signals as pilot signals for decoding the plurality of sidelink shared channel signals. In some aspects, this may include the first UE 405 determining that a previous attempt to decode at least one the plurality of sidelink shared channel signals was unsuccessful.

In some aspects, the first UE 405 may identify that at least one of the plurality of sidelink control channel signals and the at least one of the plurality of sidelink shared channel signals are transmitted using the same antenna port. In some aspects, the first UE 405 may identify that at least one of the plurality of sidelink control channel signals and at least one of the plurality of sidelink shared channel signals are transmitted on adjacent frequencies.

At 425, the first UE 405 may decode the plurality of sidelink shared channel signals based at least in part on the plurality of sidelink control channel signals as pilot signals.

In some aspects, the plurality of sidelink control channel signals may be encoded sidelink control channel signals. The first UE 405 may decode one or more of the encoded sidelink control channel signals as one or more decoded sidelink control channel signals. The first UE 405 may re-encode, based on the determining, the one or more decoded sidelink control channel signals as one or more re-encoded sidelink control channel signals. The first UE 405 may determine a first set of parameters associated with the one or more sidelink control channels on which the encoded sidelink control channel signals are received. The first set of parameters may be determined based at least in part on a comparison of the one or more encoded sidelink control channel signals and the one or more re-encoded sidelink control channel signals. The first set of parameters may be used in decoding the plurality of sidelink shared channel signals.

In some aspects, the first UE 405 may refrain from determining a second set of parameters based on sidelink shared channel pilot signals for a plurality of sidelink shared channels on which the plurality of sidelink shared channel signals are received. The first UE 405 may use the first set of parameters as estimated channel parameters in decoding the plurality of sidelink shared channel signals.

In some aspects, the first UE 405 may determine a second set of parameters based on sidelink shared channel pilot signals for a plurality of sidelink shared channels on which the plurality of sidelink shared channel signals are received. The first UE 405 may use the first set of parameters as course channel parameters in a first step of decoding the plurality of sidelink shared channel signals and use the second set of parameters in a second step of decoding the plurality of sidelink shared channel signals. That is, the first UE 405 may use the second set of parameters as fine channel parameters in the second step of decoding the plurality of sidelink shared channel signals.

In some aspects, the first UE 405 may determine a second set of parameters based on sidelink shared channel pilot signals for a plurality of sidelink shared channels on which the plurality of sidelink shared channel signals are received. The first UE 405 may determine jointly estimated channel parameters based at least in part on the first set of parameters and the second set of parameters and use the jointly estimated channel parameters in decoding the plurality of sidelink shared channel signals.

In some aspects, the parameters within the first set of parameters and/or the second set of parameters may include, but are not limited to, a frequency offset, a timing offset, a Doppler spread, a delay spread, a noise covariance estimation, and/or a channel response estimation.

In some aspects, decoding one or more of the plurality of encoded sidelink control channel signals as one or more decoded sidelink control channel signals may include verifying that each of the one or more decoded sidelink control channel signals passes a CRC.

Figure 5:
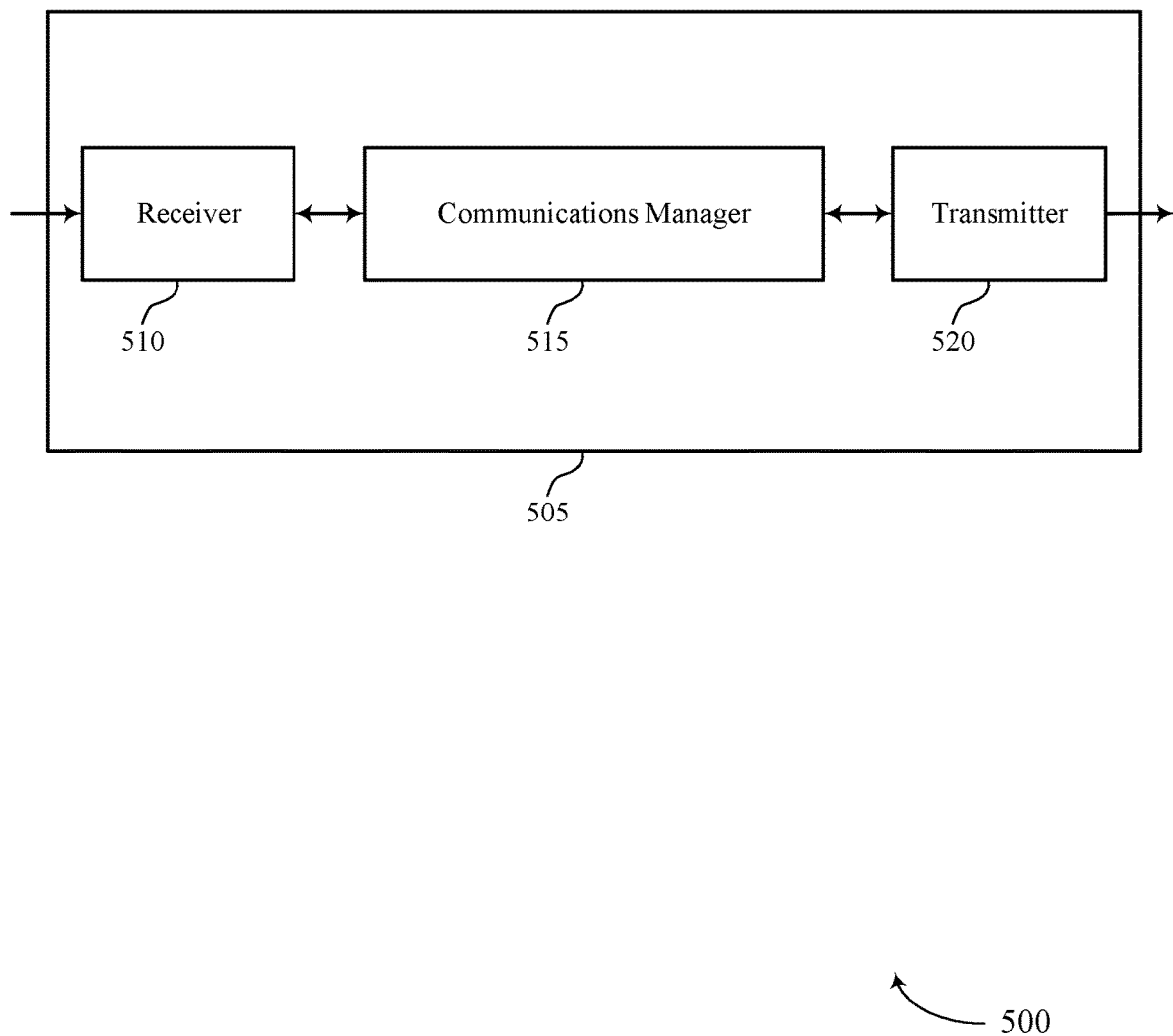
FIGS. 5 and 6 show block diagrams of devices that support sidelink control channel successive parameter estimation in accordance with aspects of the present disclosure.

FIG. 5 shows a block diagram 500 of a device 505 that supports sidelink control channel successive parameter estimation in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to sidelink control channel successive parameter estimation, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, within a subframe, a set of sidelink control channel signals providing scheduling information for a set of sidelink shared channel signals that are also received within the subframe, determine to use one or more of the set of sidelink control channel signals as pilot signals for decoding the set of sidelink shared channel signals, and decode the set of sidelink shared channel signals based on the set of sidelink control channel signals as pilot signals. The communications manager 515 may be an example of aspects of the communications manager 810 described herein.

The communications manager 515 may receive, from a first wireless device and within a subframe, a first set of sidelink control channel signals providing scheduling information for a first set of sidelink shared channel signals that are received within a first set of subcarriers of the subframe, determine that at least one of a second set of sidelink control channel signals or a second set of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers, perform an interference canceling procedure in order to cancel at least a portion of the interfering signal portion on one or more subcarriers in the second set of subcarriers that are within the first set of subcarriers of the subframe, and decode the first set of sidelink shared channel signals after the interference canceling procedure. The communications manager 515 may be an example of aspects of the communications manager 810/1415 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
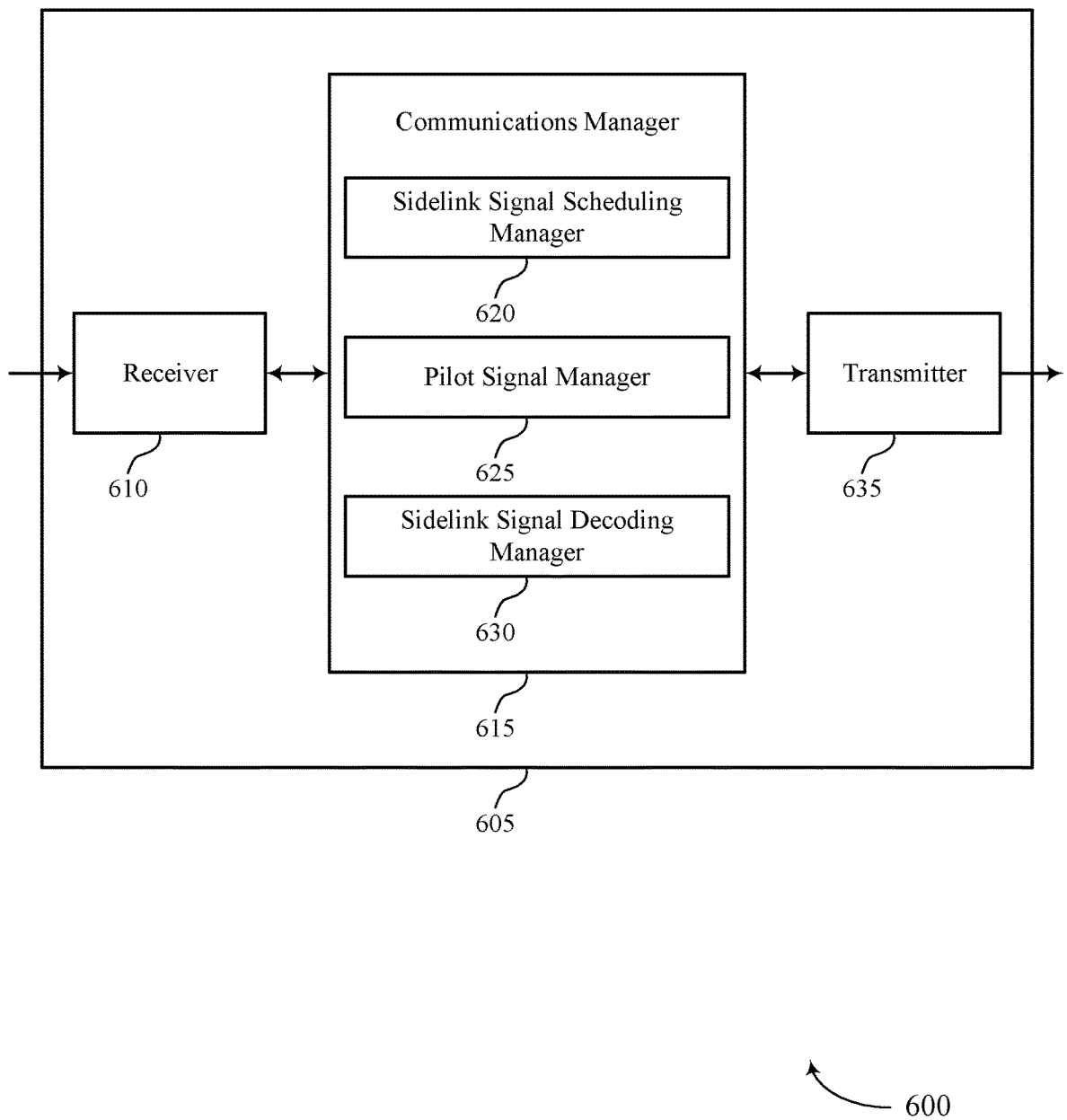

FIG. 6 shows a block diagram 600 of a device 605 that supports sidelink control channel successive parameter estimation in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to sidelink control channel successive parameter estimation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a sidelink signal scheduling manager 620, a pilot signal manager 625, and a sidelink signal decoding manager 630. The communications manager 615 may be an example of aspects of the communications manager 810 described herein.

The sidelink signal scheduling manager 620 may receive, within a subframe, a set of sidelink control channel signals providing scheduling information for a set of sidelink shared channel signals that are also received within the subframe.

The pilot signal manager 625 may determine to use one or more of the set of sidelink control channel signals as pilot signals for decoding the set of sidelink shared channel signals.

The sidelink signal decoding manager 630 may decode the set of sidelink shared channel signals based on the set of sidelink control channel signals as pilot signals.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
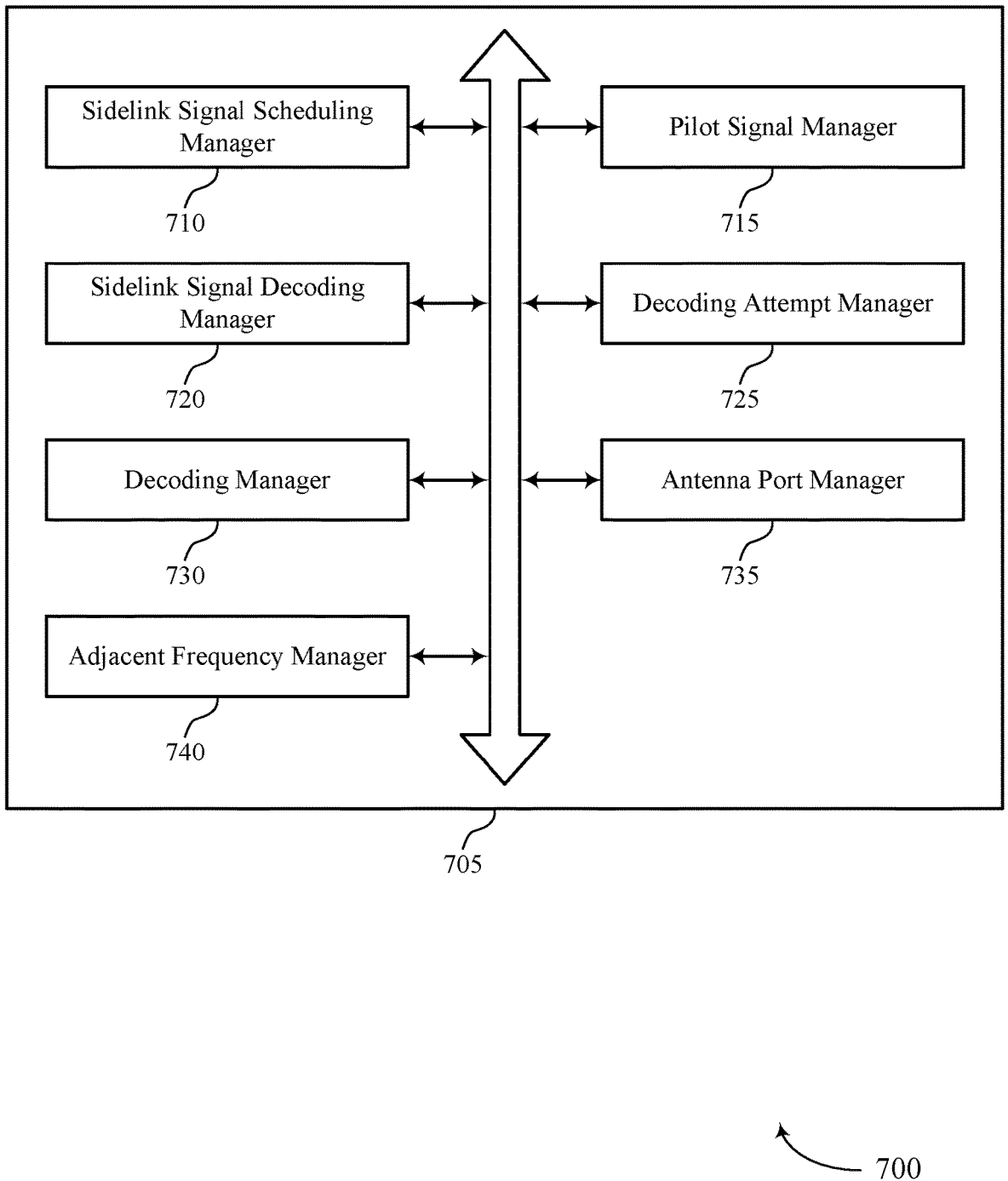
FIG. 7 shows a block diagram of a communications manager that supports sidelink control channel successive parameter estimation in accordance with aspects of the present disclosure.

FIG. 7 shows a block diagram 700 of a communications manager 705 that supports sidelink control channel successive parameter estimation in accordance with aspects of the present disclosure. The communications manager 705 may be an example of aspects of a communications manager 515, a communications manager 615, or a communications manager 810 described herein. The communications manager 705 may include a sidelink signal scheduling manager 710, a pilot signal manager 715, a sidelink signal decoding manager 720, a decoding attempt manager 725, a decoding manager 730, an antenna port manager 735, and an adjacent frequency manager 740. Each of these modules may communicate, directly or indirectly, with one another (e.g., via one or more buses).

The sidelink signal scheduling manager 710 may receive, within a subframe, a set of sidelink control channel signals providing scheduling information for a set of sidelink shared channel signals that are also received within the subframe. In some cases, the set of sidelink control channel signals and the set of sidelink shared channel signals are CV2X signals. In some cases, the set of sidelink control channel signals are PSCCH signals and the set of sidelink shared channel signals are PSSCH signals.

The pilot signal manager 715 may determine to use one or more of the set of sidelink control channel signals as pilot signals for decoding the set of sidelink shared channel signals.

The sidelink signal decoding manager 720 may decode the set of sidelink shared channel signals based on the set of sidelink control channel signals as pilot signals.

The decoding attempt manager 725 may determine that a previous attempt to decode at least one of the set of sidelink shared channel signals was unsuccessful.

The decoding manager 730 may decode one or more of the encoded sidelink control channel signals as one or more decoded sidelink control channel signals. In some examples, the decoding manager 730 may re-encode, based on the determining, the one or more decoded sidelink control channel signals as one or more re-encoded sidelink control channel signals. In some examples, the decoding manager 730 may determine a first set of parameters associated with the one or more of sidelink control channels on which the encoded sidelink control channel signals are received, the first set of parameters determined based on a comparison of the one or more encoded sidelink control channel signals and the one or more re-encoded sidelink control channel signals, where the first set of parameters are used in the decoding of the set of sidelink shared channel signals.

In some examples, the decoding manager 730 may refrain from determining a second set of parameters based on sidelink shared channel pilot signals for a set of sidelink shared channels on which the set of sidelink shared channel signals are received. In some examples, the decoding manager 730 may use the first set of parameters as estimated channel parameters in decoding the set of sidelink shared channel signals. In some examples, the decoding manager 730 may determine a second set of parameters based on sidelink shared channel pilot signals for a set of sidelink shared channels on which the set of sidelink shared channel signals are received. In some examples, the decoding manager 730 may use the first set of parameters as course channel parameters in a first step of decoding the set of sidelink shared channel signals. In some examples, the decoding manager 730 may use the second set of parameters in a second step of decoding the set of sidelink shared channel signals. In some examples, the decoding manager 730 may determine a second set of parameters based on sidelink shared channel pilot signals for a set of sidelink shared channels on which the set of sidelink shared channel signals are received.

In some examples, the decoding manager 730 may determine jointly estimated channel parameters based on the first set of parameters and the second set of parameters. In some examples, the decoding manager 730 may use the determined jointly estimated channel parameters in decoding the set of sidelink shared channel signals. In some examples, the decoding manager 730 may verify that each of the one or more decoded sidelink control channel signals passes a cyclic redundancy check. In some cases, the first set of parameters and/or the second set of parameters includes at least one of a frequency offset, or a timing offset, or a Doppler spread, or a delay spread, or a noise covariance estimation, or a channel response estimation, or a combination thereof.

The antenna port manager 735 may identify that at least one of the set of sidelink control channel signals and at least one of the set of sidelink shared channel signals are transmitted using a same antenna port.

The adjacent frequency manager 740 may identify that at least one of the set of sidelink control channel signals and at least one of the set of sidelink shared channel signals are transmitted on adjacent frequencies.

Figure 8:
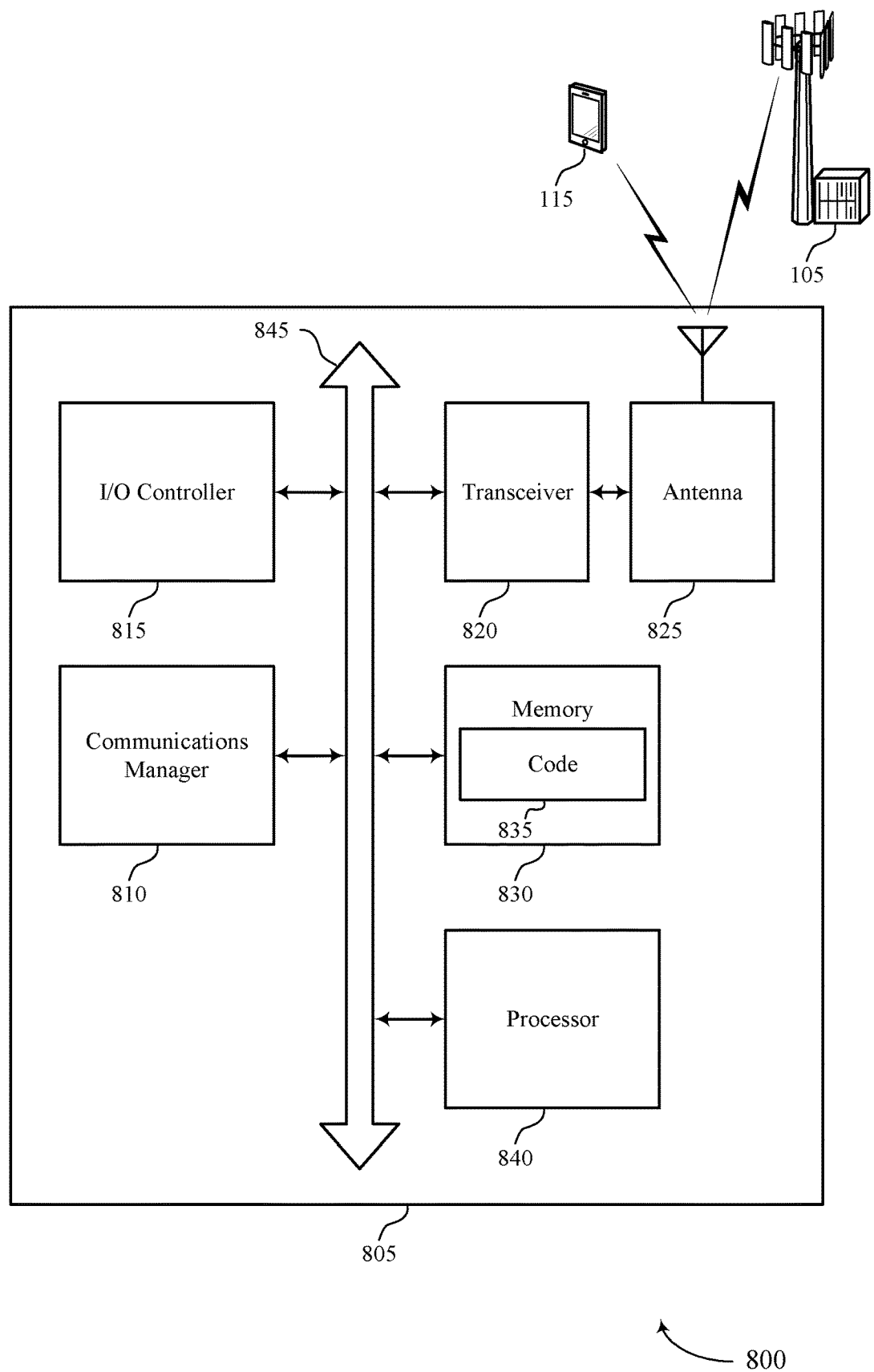
FIG. 8 shows a diagram of a system including a device that supports sidelink control channel successive parameter estimation in accordance with aspects of the present disclosure.

FIG. 8 shows a diagram of a system 800 including a device 805 that supports sidelink control channel successive parameter estimation in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, within a subframe, a set of sidelink control channel signals providing scheduling information for a set of sidelink shared channel signals that are also received within the subframe, determine to use one or more of the set of sidelink control channel signals as pilot signals for decoding the set of sidelink shared channel signals, and decode the set of sidelink shared channel signals based on the set of sidelink control channel signals as pilot signals.

The communications manager 810 may receive, from a first wireless device and within a subframe, a first set of sidelink control channel signals providing scheduling information for a first set of sidelink shared channel signals that are received within a first set of subcarriers of the subframe, determine that at least one of a second set of sidelink control channel signals or a second set of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers, perform an interference canceling procedure in order to cancel at least a portion of the interfering signal portion on one or more subcarriers in the second set of subcarriers that are within the first set of subcarriers of the subframe, and decode the first set of sidelink shared channel signals after the interference canceling procedure.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink control channel successive parameter estimation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
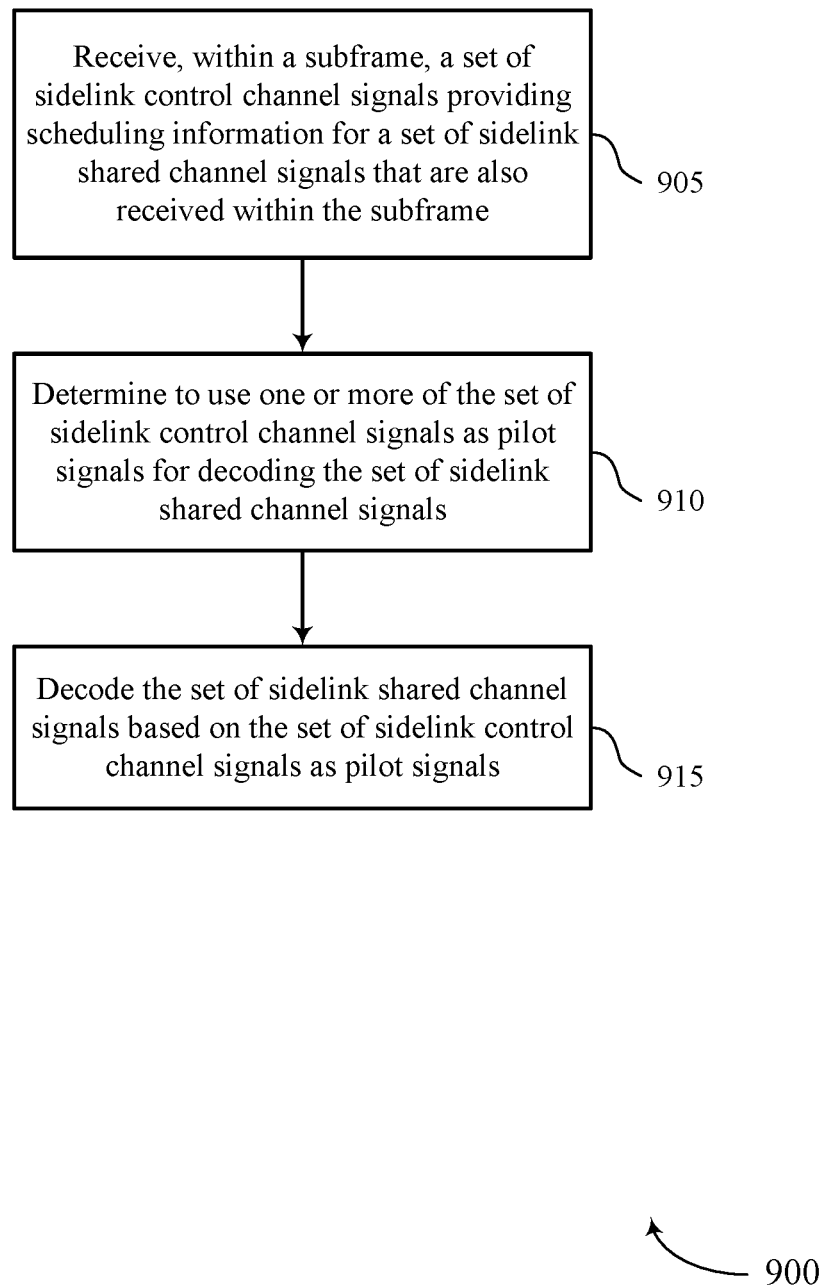
FIGS. 9 through 11 show flowcharts illustrating methods that support sidelink control channel successive parameter estimation in accordance with aspects of the present disclosure.

FIG. 9 shows a flowchart illustrating a method 900 that supports sidelink control channel successive parameter estimation in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive, within a subframe, a set of sidelink control channel signals providing scheduling information for a set of sidelink shared channel signals that are also received within the subframe. The operations of 905 may be performed according to the methods described herein. In some examples, aspects of the operations of 905 may be performed by a sidelink signal scheduling manager as described with reference to FIGS. 5 through 8.

At 910, the UE may determine to use one or more of the set of sidelink control channel signals as pilot signals for decoding the set of sidelink shared channel signals. The operations of 910 may be performed according to the methods described herein. In some examples, aspects of the operations of 910 may be performed by a pilot signal manager as described with reference to FIGS. 5 through 8.

At 915, the UE may decode the set of sidelink shared channel signals based on the set of sidelink control channel signals as pilot signals. The operations of 915 may be performed according to the methods described herein. In some examples, aspects of the operations of 915 may be performed by a sidelink signal decoding manager as described with reference to FIGS. 5 through 8.

Figure 10:
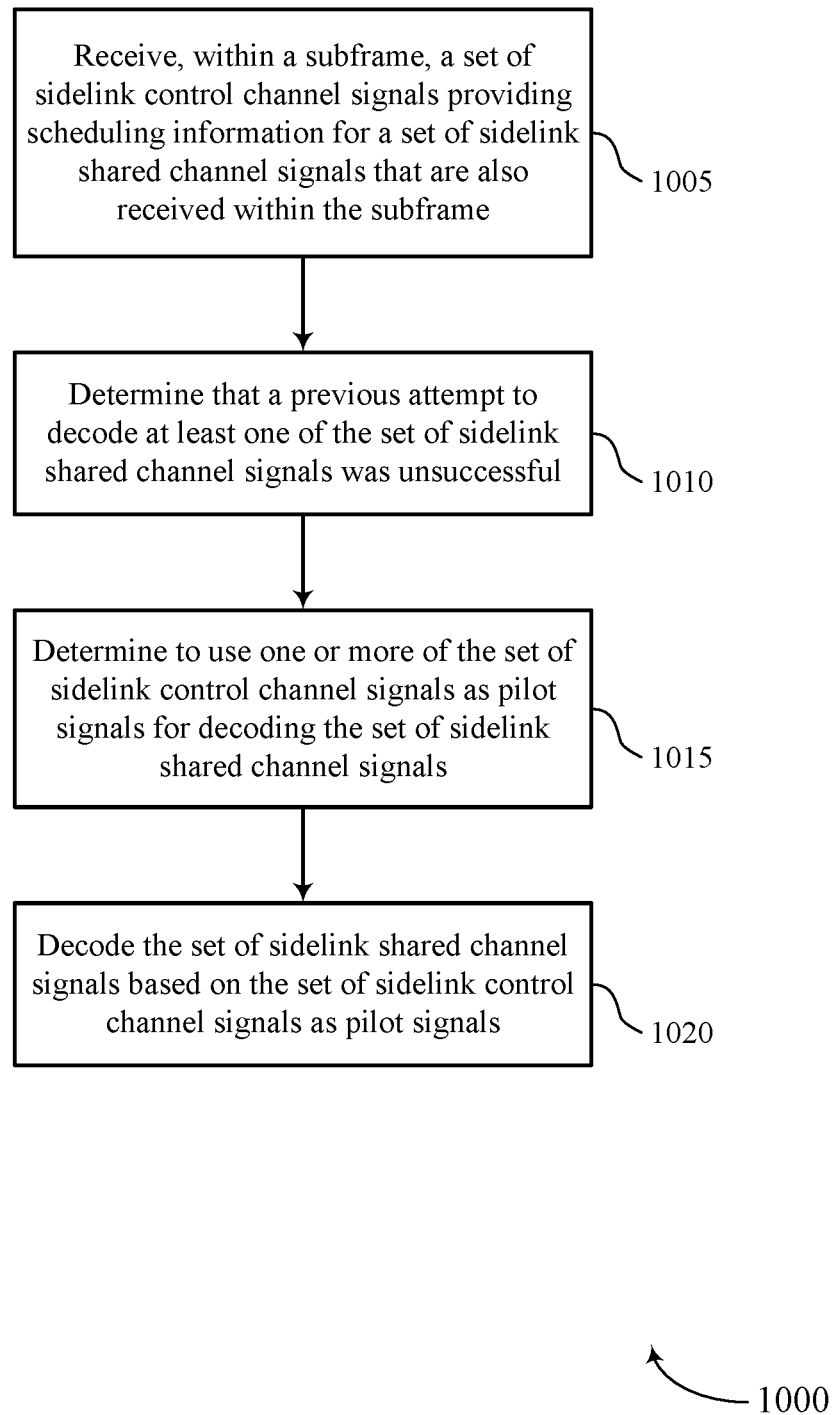

FIG. 10 shows a flowchart illustrating a method 1000 that supports sidelink control channel successive parameter estimation in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive, within a subframe, a set of sidelink control channel signals providing scheduling information for a set of sidelink shared channel signals that are also received within the subframe. The operations of 1005 may be performed according to the methods described herein. In some examples, aspects of the operations of 1005 may be performed by a sidelink signal scheduling manager as described with reference to FIGS. 5 through 8.

At 1010, the UE may determine that a previous attempt to decode at least one of the set of sidelink shared channel signals was unsuccessful. The operations of 1010 may be performed according to the methods described herein. In some examples, aspects of the operations of 1010 may be performed by a decoding attempt manager as described with reference to FIGS. 5 through 8.

At 1015, the UE may determine to use one or more of the set of sidelink control channel signals as pilot signals for decoding the set of sidelink shared channel signals. The operations of 1015 may be performed according to the methods described herein. In some examples, aspects of the operations of 1015 may be performed by a pilot signal manager as described with reference to FIGS. 5 through 8.

At 1020, the UE may decode the set of sidelink shared channel signals based on the set of sidelink control channel signals as pilot signals. The operations of 1020 may be performed according to the methods described herein. In some examples, aspects of the operations of 1020 may be performed by a sidelink signal decoding manager as described with reference to FIGS. 5 through 8.

Figure 11:
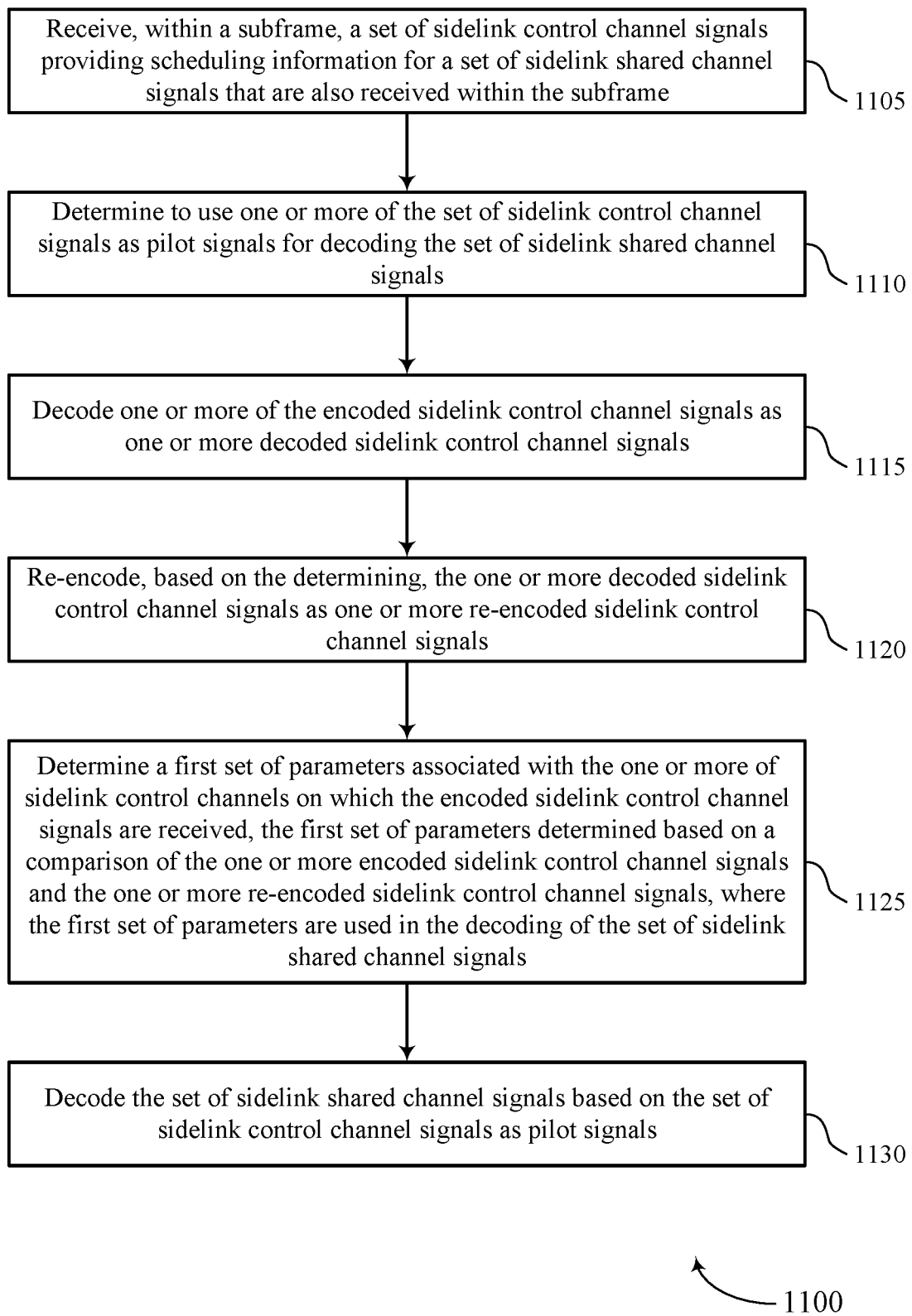

FIG. 11 shows a flowchart illustrating a method 1100 that supports sidelink control channel successive parameter estimation in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive, within a subframe, a set of sidelink control channel signals providing scheduling information for a set of sidelink shared channel signals that are also received within the subframe. The operations of 1105 may be performed according to the methods described herein. In some examples, aspects of the operations of 1105 may be performed by a sidelink signal scheduling manager as described with reference to FIGS. 5 through 8.

At 1110, the UE may determine to use one or more of the set of sidelink control channel signals as pilot signals for decoding the set of sidelink shared channel signals. The operations of 1110 may be performed according to the methods described herein. In some examples, aspects of the operations of 1110 may be performed by a pilot signal manager as described with reference to FIGS. 5 through 8.

At 1115, the UE may decode one or more of the encoded sidelink control channel signals as one or more decoded sidelink control channel signals. The operations of 1115 may be performed according to the methods described herein. In some examples, aspects of the operations of 1115 may be performed by a decoding manager as described with reference to FIGS. 5 through 8.

At 1120, the UE may re-encode, based on the determining, the one or more decoded sidelink control channel signals as one or more re-encoded sidelink control channel signals. The operations of 1120 may be performed according to the methods described herein. In some examples, aspects of the operations of 1120 may be performed by a decoding manager as described with reference to FIGS. 5 through 8.

At 1125, the UE may determine a first set of parameters associated with the one or more of sidelink control channels on which the encoded sidelink control channel signals are received, the first set of parameters determined based on a comparison of the one or more encoded sidelink control channel signals and the one or more re-encoded sidelink control channel signals, where the first set of parameters are used in the decoding of the set of sidelink shared channel signals. The operations of 1125 may be performed according to the methods described herein. In some examples, aspects of the operations of 1125 may be performed by a decoding manager as described with reference to FIGS. 5 through 8.

At 1130, the UE may decode the set of sidelink shared channel signals based on the set of sidelink control channel signals as pilot signals. The operations of 1130 may be performed according to the methods described herein. In some examples, aspects of the operations of 1130 may be performed by a sidelink signal decoding manager as described with reference to FIGS. 5 through 8.

Figure 12A:
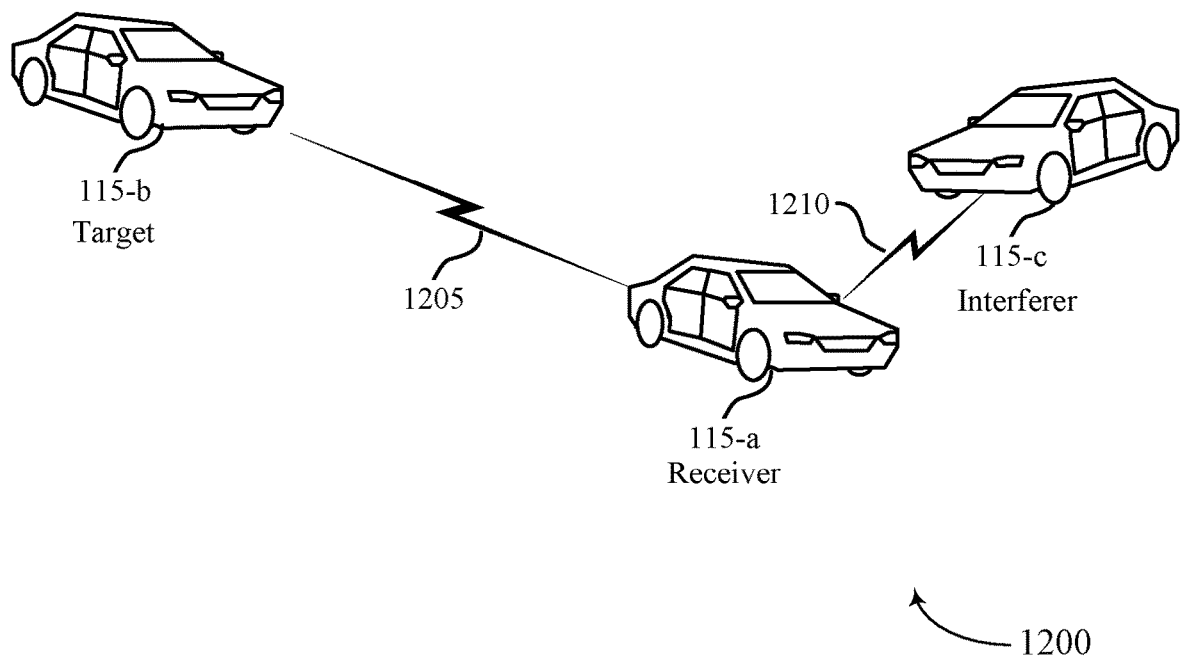
FIG. 12A illustrates an example of a wireless communication system that supports sidelink shared channel successive leakage cancellation in accordance with aspects of the present disclosure.

FIG. 12A illustrates an example of a wireless communication system 1200 that supports sidelink shared channel successive leakage cancellation in accordance with aspects of the present disclosure. In some examples, wireless communication system 1200 may implement aspects of wireless communication system 100. Aspects of wireless communication system 1200 may be implemented by a UE 115 (vehicle) as described with reference to FIG. 1.

In some aspects, wireless communication system 1200 may support vehicle safety and operational management, such as a CV2X network. Accordingly, one or more of the vehicles 115 may be considered as UEs within the context of the CV2X network. In some aspects, each UE 115 of wireless communication system 1200 (e.g., UEs 115-*a*, 115-*b*, and 115-*c*) may be configured with a resource allocation for performing CV2X communications. For example, each UE may be configured with a set of frequencies or subcarriers that are allocated for monitoring and receiving control signals (e.g., PSCCH signals) within a subframe. In some aspects, each UE may also be configured with a set of frequencies or subcarriers that are allocated for monitoring and receiving data signals (e.g., PSSCH signals) within the subframe. In some aspects, wireless communication system 1200 may operate as a mmW system or a sub-6 GHz system.

According to some techniques, receiving CV2X communications may be performed by decoding the PSCCH signals first and, based on the decoded PSCCH signals, decoding the PSSCH signals next. In some aspects, V2V communications may be one of the main CV2X applications. In V2V conditions, the accuracy of the channel parameters estimation (e.g., timing offset, frequency offset, channel response, noise power, delay spread, Doppler spread, etc.) may dictate the overall reception performance.

For example, wireless communication system 1200 may include UEs 115-*a*, 115-*b*, and 115-*c* performing V2V communications with each other. In this example, UE 115-*a* may act as a receiver of V2V signals, with UE 115-*b* transmitting a first signal 1205 and UE 115-*c* transmitting an interfering signal 1210. Frequency orthogonality between different signals in CV2X communications may hold if there is little or no frequency offset. In other words, if the frequency offset of an interfering signal with respect to the first (or victim) signal is relatively small, the interference from the interfering signal may be negligible. However, if the frequency offset of an interfering signal with respect to the victim signal is relatively large, the interference from the interfering signal may be significant.

In wireless communication system 1200, since UE 115-*c* is closer to UE 115-*a* than UE 115-*b*, interfering signal 1210 may be stronger than first signal 1205. If UE 115-*c* is driving toward UE 115-*a* with a high rate of speed, interfering signal 1210 may have a high frequency offset, which could result in leakage into a bandwidth allocated for reception of the first signal 1205. In another example, if UE 115-*c* is driving toward UE 115-*a* with a low rate of speed or is idle, a low frequency offset of interfering signal 1210 may result with respect to first signal 1205.

Figure 12B:
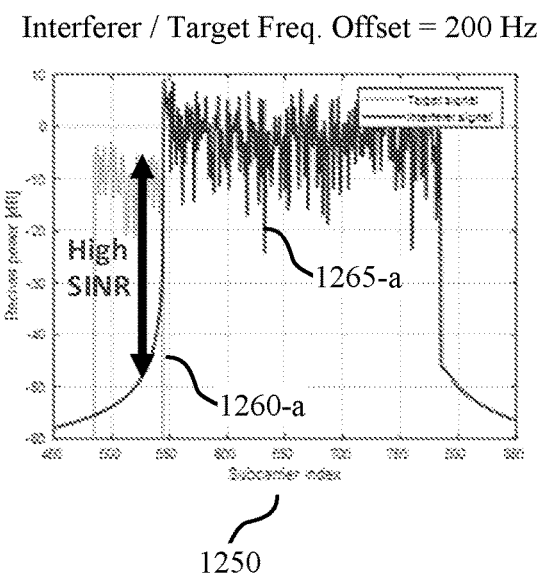
FIG. 12B illustrates examples of frequency domain representations in accordance with aspects of the present disclosure.
Figure 12B:
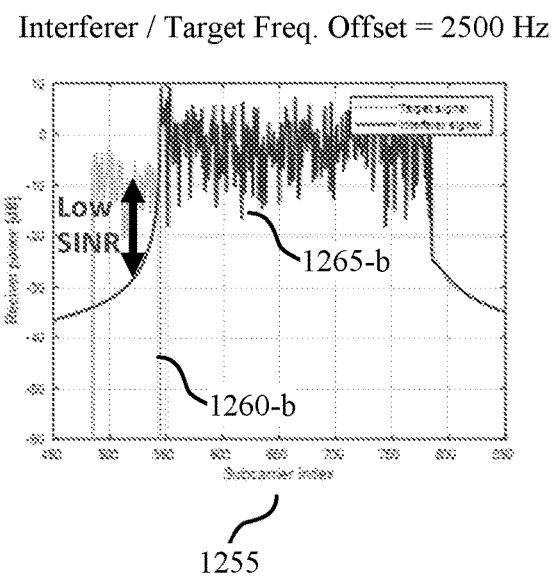

FIG. 12B illustrates examples of frequency domain representations 1250 and 1255 in accordance with aspects of the present disclosure. In some examples, frequency domain representations 1250 and 1255 may be representative of some aspects of wireless communication systems 100 and 200.

Frequency domain representation 1250 may be an example where a receiver (e.g., UE 115-*a*) may receive both a first signal 1260-*a* (e.g., first signal 1205) and an interfering signal 1265-*a* (e.g., interfering signal 1210), where the first signal 1260-*a* is received within a bandwidth that is near that allocated for reception of interfering signal 1265-*a*. In this particular illustration, the frequency offset of the interfering signal 1265-*a* with respect to the first signal 1260-*a* is 200 Hz. Because the frequency offset is relatively small, and because the signal-to-interference plus noise ratio (SINR) for the first signal 1260-*a* is relatively large (with respect to the interfering signal 1265-*a*), the orthogonality between the two signals is preserved. In turn, the receiver may be more likely to successfully receive and decode first signal 1260-*a* (e.g., a target signal) despite the presence of interfering signal 1265-*a*.

Frequency domain representation 1255 may be an example where a receiver (e.g., UE 115-*a*) may receive both a first signal 1260-*b* (e.g., a target signal, such as first signal 1205) and an interfering signal 1265-*b* (e.g., interfering signal 1210), where the interfering signal 1265-*b* has a relatively high frequency offset with respect to the first signal 1260-*b*. In this particular illustration, the frequency offset of interfering signal 1265-*b* with respect to first signal 1260-*b* is 2500 Hz. Because the frequency offset of interfering signal 1265-*b* is relatively high, and because the SINR of the first signal 1260-*b* is low, the orthogonality between the two signals is not preserved. In turn, the receiver may be less likely to successfully receive and decode first signal 1260-*b* (e.g., the target signal) due to the presence of interfering signal 1265-*b*.

Figure 13:
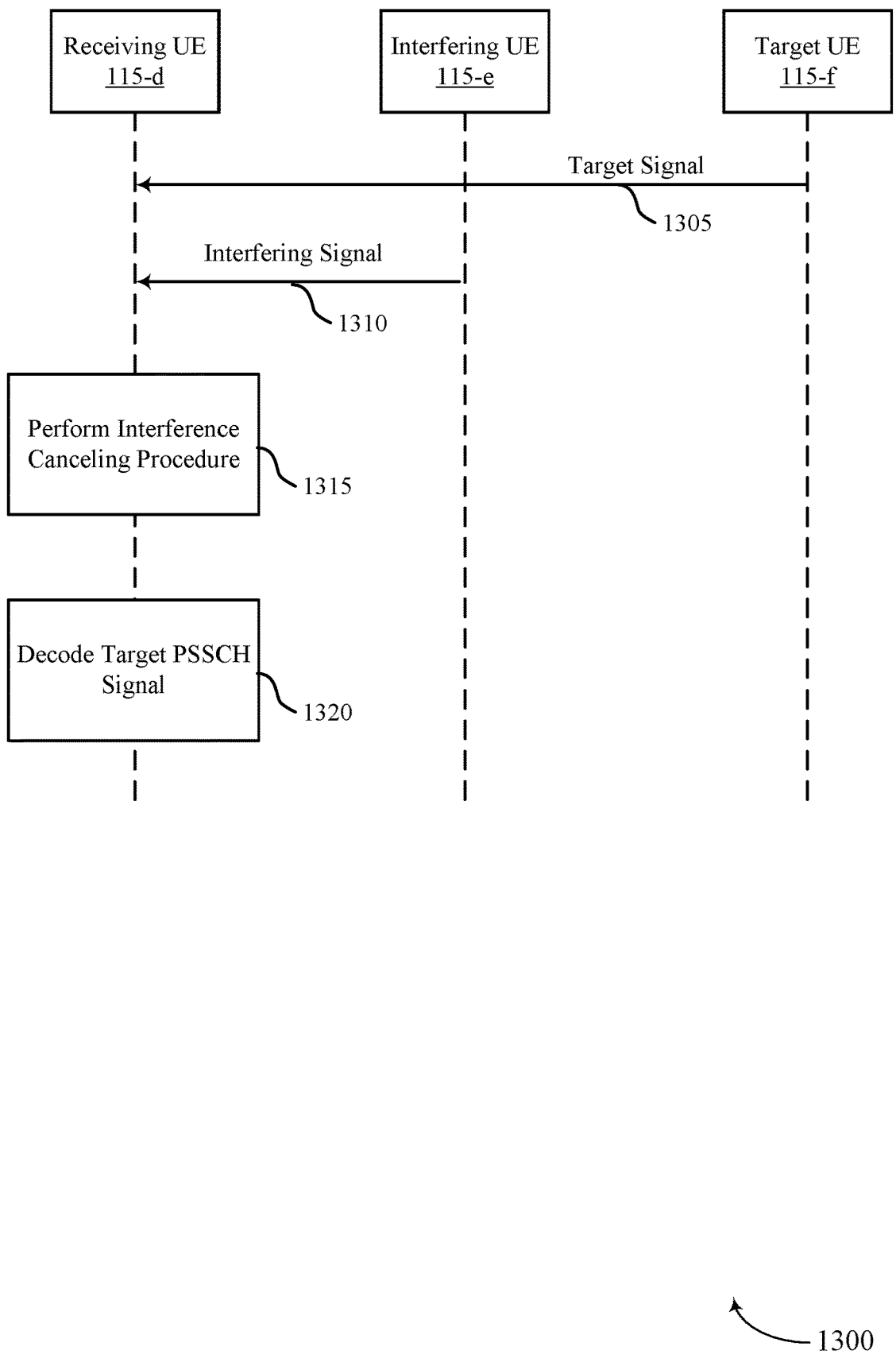
FIG. 13 illustrates an example of a process that supports sidelink shared channel successive leakage cancellation in accordance with aspects of the present disclosure.

FIG. 13 illustrates an example of a process 1300 that supports sidelink shared channel successive leakage cancellation in accordance with aspects of the present disclosure. In some examples, process 1300 may implement aspects of wireless communication systems 100 and/or 200 and/or CV2X subframe 300. Aspects of process 1300 may be implemented by receiving UE 115-*d*, interfering UE 115-*e*, and target UE 115-*f*, which may be examples of corresponding devices described herein. Process 400 may be performed within a CV2X network.

At 1305, receiving UE 115-*d* may receive and decode from target UE 115-*f*, within a subframe, a plurality of sidelink control channel signals (e.g., PSCCH signals) that carry or convey scheduling information for a plurality of sidelink shared channel signals (e.g., PSSCH signals) that are also received within the subframe. Decoding the plurality of sidelink control channel signals from target UE 115-*f* may involve verifying that each of the plurality of sidelink control channel signals passes a cyclic redundancy check. The plurality of sidelink control channel signals may be received in a first set of subcarriers of the subframe allotted to target UE 115-*f*.

At 1310, receiving UE 115-*d* may receive and decode from interfering UE 115-*e*, within the same subframe as described in 1305, a plurality of sidelink control channel signals and/or a plurality of sidelink shared channel signals. Decoding the plurality of sidelink control channel signals from interfering UE 115-*e* may involve verifying that each of the plurality of sidelink control channel signals passes a cyclic redundancy check. The plurality of sidelink control channel signals and plurality of sidelink shared channel signals may be received in a second set of subcarriers of the subframe allotted to interfering UE 115-*e*. The second set of subcarriers may be different than the first set of subcarriers, and at least a portion (e.g., one or more of the subcarriers) of the second set of subcarriers may be an interfering signal portion within the first set of subcarriers. The interfering signal portion may be comprised of either the plurality of sidelink control channel signals or the plurality of sidelink shared channel signals, or both. The interfering signal portion may also be comprised of a compound of either the plurality of sidelink control channel signals or the plurality of sidelink shared channel signals, or both, and at least one of a synchronization signal, a feedback signal, or a channel state information reference signal.

At 1315, with the decoded signals from 1305 and 1310, receiving UE 115-*d* may perform an interference canceling procedure to cancel the interfering signal portion on one or more subcarriers in the second set of subcarriers that are within the first set of subcarriers of the subframe. The interference canceling procedure may utilize various techniques in canceling the interfering signal portion. For example, receiving UE 115-*d* may identify that the interfering signal portion exceeds a predetermined signal strength threshold within the first set of subcarriers of the subframe. In another case, receiving UE 115-*d* may identify that the first set of subcarriers and the second set of subcarriers are within a threshold frequency offset of each other. Other techniques that receiving UE 115-*d* may utilize in identifying the interfering signal portion include identifying that the first set of subcarriers and the second set of subcarriers are adjacent to each other, or identifying relative frequency domain positions of the first set of subcarriers and the second set of subcarriers.

Additionally, in determining the interfering signal portion, receiving UE 115-*d* may identify at least one of a modulation and coding scheme, a retransmission policy, or an allocation size and position of the plurality of sidelink shared channel signals from target UE 115-*f*, and then determine that the plurality of sidelink shared channel signals from target UE 115-*f* is subject to interference by the plurality of sidelink control channel signals or plurality of sidelink shared channel signals from interfering UE 115-*e* based at least in part on the determined modulation and coding scheme, the retransmission policy, or the allocation size and position of the plurality of sidelink shared channel signals from target UE 115-*f*.

Also, in determining the interfering signal portion, receiving UE 115-*d* may determine at least one of an estimated received power, an estimated signal-to-noise ratio, or an estimated frequency offset from the decoded plurality of sidelink shared channel signals from target UE 115-*f*, and then determine that the plurality of sidelink shared channel signals from target UE 115-*f* is subject to interference by the plurality of sidelink control channel signals or plurality of sidelink shared channel signals from interfering UE 115-*e* based at least in part on the estimated received power, the estimated signal-to-noise ratio, or the estimated frequency offset.

Also at 1315, as part of the interference canceling procedure, receiving UE 115-*d* may re-encode the interfering signal and then use the re-encoded interfering signal to cancel at least the portion of the interfering signal portion on the one or more subcarriers in the second set of subcarriers that are within the first subcarrier of the subframe. The interfering canceling procedure may also comprise receiving UE 115-*d* canceling at least a portion of frequency leakage from the interfering signal portion in the first set of subcarriers of the subframe.

At 1320, after performing the interference canceling procedure, receiving UE 115-*d* may decode the plurality of sidelink shared channel signals from target UE 115-*f* received within the subframe on the first set of subcarriers.

Figure 14:
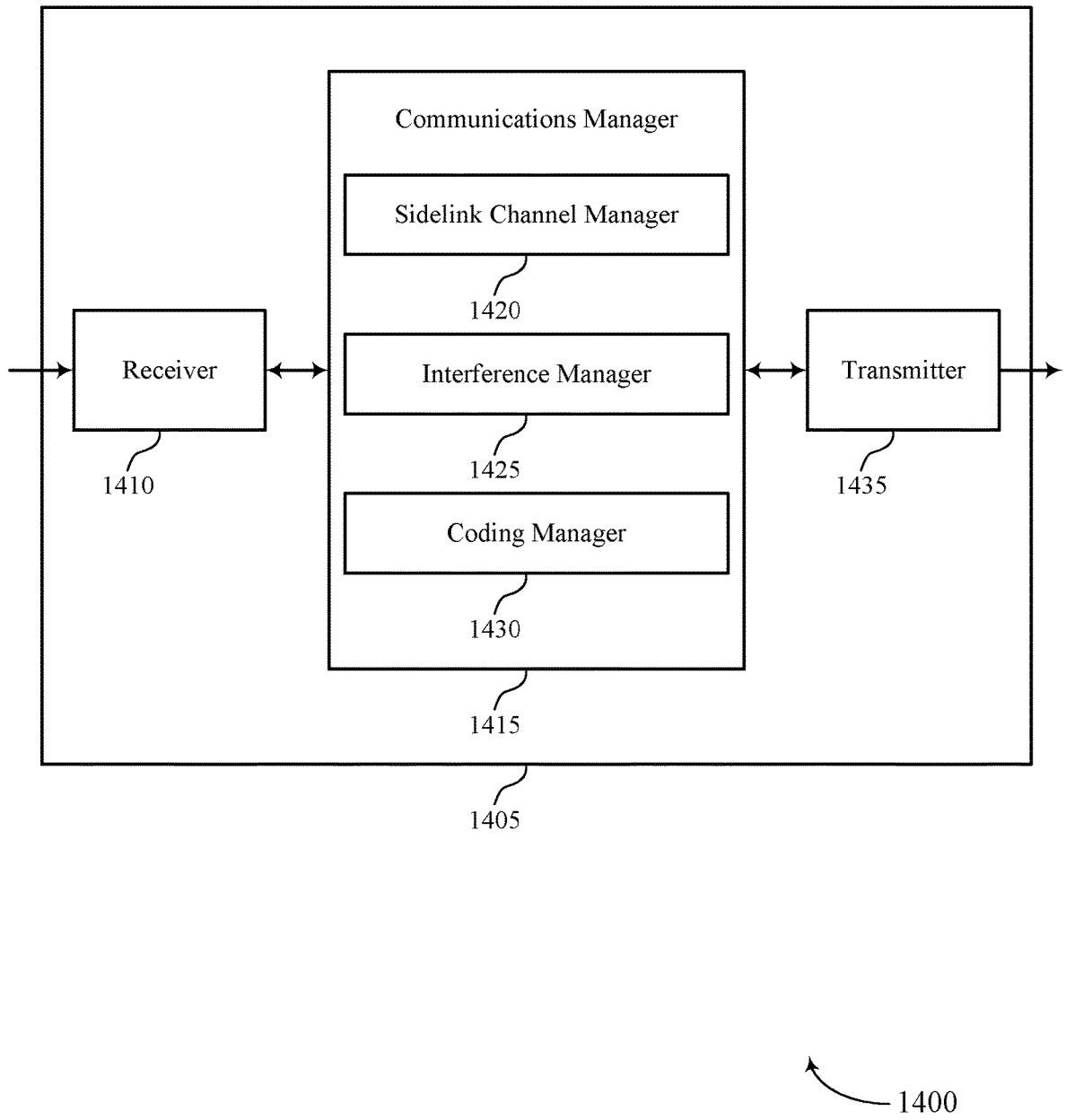
FIG. 14 shows a block diagram of devices that support sidelink shared channel successive leakage cancellation in accordance with aspects of the present disclosure.

FIG. 14 shows a block diagram 1400 of a device 1405 that supports sidelink shared channel successive leakage cancellation in accordance with aspects of the present disclosure. The device 1405 may be an example of aspects of a device 505, or a UE 115 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to sidelink shared channel successive leakage cancellation, etc.). Information may be passed on to other components of the device 1405. The receiver 610 may be an example of aspects of the transceiver 820 described with reference to FIG. 8. The receiver 1410 may utilize a single antenna or a set of antennas.

The communications manager 1415 may be an example of aspects of the communications manager 515 as described herein. The communications manager 1415 may include a sidelink channel manager 1420, an interference manager 1425, and a coding manager 1430. The communications manager 1415 may be an example of aspects of the communications manager 810 described herein.

The actions performed by filter manager 1415 as described herein may be implemented to realize one or more potential advantages. One implementation may allow a UE 115 to mitigate interfering signals. Another implementation may provide improved data throughput and better user experience at the UE 115 as interference is reduced.

The sidelink channel manager 1420 may receive, from a first wireless device and within a subframe, a first set of sidelink control channel signals providing scheduling information for a first set of sidelink shared channel signals that are received within a first set of subcarriers of the subframe.

The interference manager 1425 may determine that at least one of a second set of sidelink control channel signals or a second set of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers and perform an interference canceling procedure in order to cancel at least a portion of the interfering signal portion on one or more subcarriers in the second set of subcarriers that are within the first set of subcarriers of the subframe.

The coding manager 1430 may decode the first set of sidelink shared channel signals after the interference canceling procedure.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 820 described with reference to FIG. 8. The transmitter 1435 may utilize a single antenna or a set of antennas.

Figure 15:
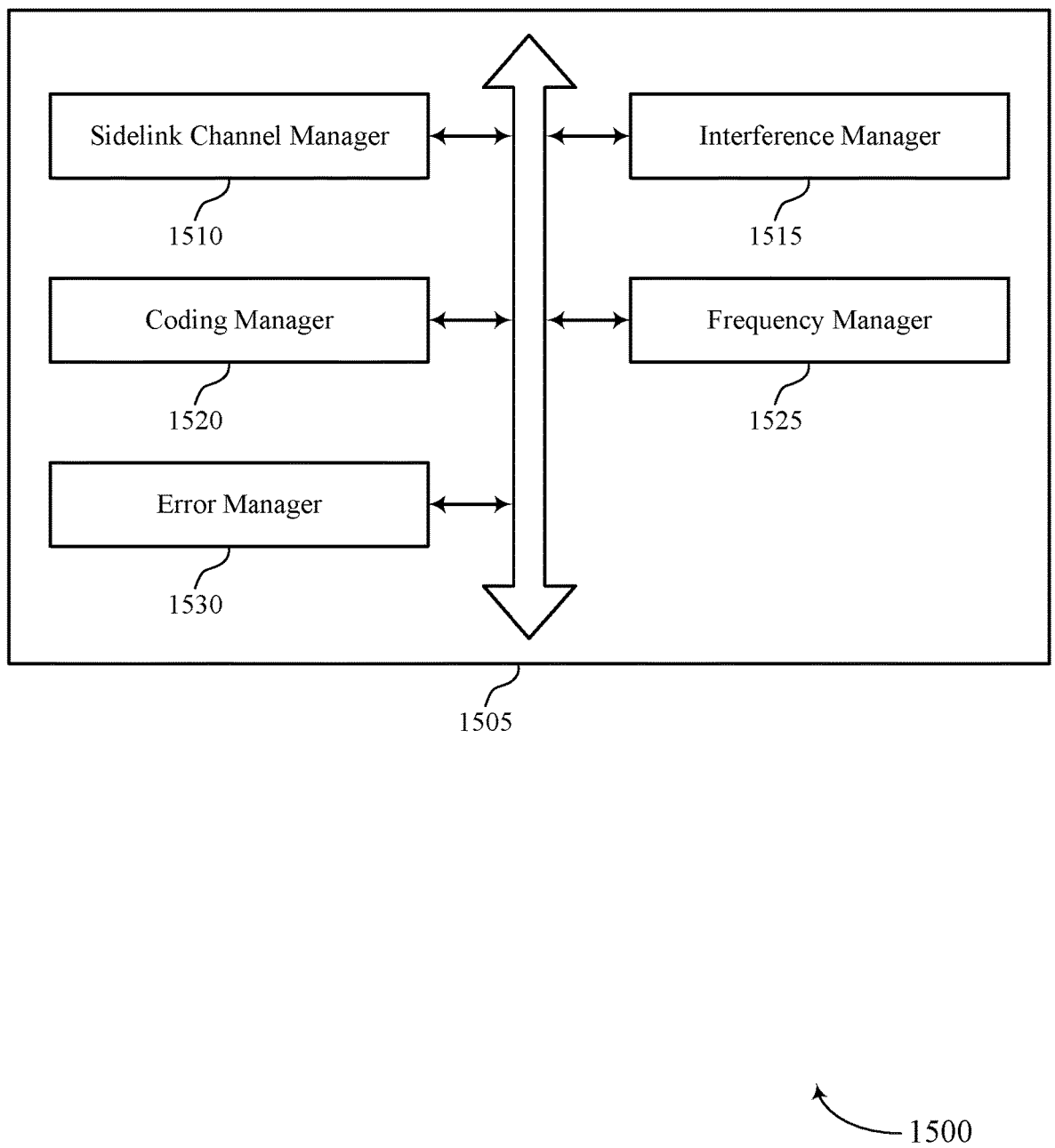
FIG. 15 shows a block diagram of a communications manager that supports sidelink shared channel successive leakage cancellation in accordance with aspects of the present disclosure.

FIG. 15 shows a block diagram 1500 of a communications manager 1505 that supports sidelink shared channel successive leakage cancellation in accordance with aspects of the present disclosure. The communications manager 1505 may be an example of aspects of a communications manager 515, a communications manager 615, a communications manager 1415, or a communications manager 810 described herein. The communications manager 1505 may include a sidelink channel manager 1510, an interference manager 1515, a coding manager 1520, a frequency manager 1525, and an error manager 1530. Each of these modules may communicate, directly or indirectly, with one another (e.g., via one or more buses).

The sidelink channel manager 1510 may receive, from a first wireless device and within a subframe, a first set of sidelink control channel signals providing scheduling information for a first set of sidelink shared channel signals that are received within a first set of subcarriers of the subframe.

In some examples, the sidelink channel manager 1510 may identify at least one of a modulation and coding scheme, a retransmission policy, or an allocation size and position of the first set of sidelink shared channel signals from the first decoded sidelink control channel signals.

In some examples, the sidelink channel manager 1510 may determine at least one of an estimated received power, an estimated signal-to-noise ratio, or an estimated frequency offset of the first set of sidelink shared channel signals based on a corresponding measured received power, a corresponding measured signal-to-noise ratio, or a corresponding measured frequency offset of the first decoded sidelink control channel signals.

The interference manager 1515 may determine that at least one of a second set of sidelink control channel signals or a second set of sidelink shared channel signals is an interfering signal that is received from a second wireless device and within a second set of subcarriers of the subframe but that includes an interfering signal portion on one or more subcarriers in the second set of subcarriers within the first set of subcarriers of the subframe, the second set of subcarriers being different from the first set of subcarriers.

In some examples, the interference manager 1515 may perform an interference canceling procedure in order to cancel at least a portion of the interfering signal portion on one or more subcarriers in the second set of subcarriers that are within the first set of subcarriers of the subframe.

In some examples, the interference manager 1515 may identify that the interfering signal portion of the one or more subcarriers in the second set of sidelink control channel signals or second set of sidelink shared channel signals exceeds a predetermined signal strength threshold within the first set of subcarrier associated with the first plurality of sidelink shared channel signals.

In some examples, the interference manager 1515 may determine that the first set of sidelink shared channel signals is subject to interference by the at least one of the second set of sidelink control channel signals or second set of sidelink shared channel signals based on the modulation and coding scheme, the retransmission policy, or the allocation size and position of the first set of sidelink shared channel signals.

In some examples, the interference manager 1515 may determine that the first set of sidelink shared channel signals is subject to interference by the at least one of the second set of sidelink control channel signals or second set of sidelink shared channel signals based on the estimated received power, the estimated signal-to-noise ratio, or the estimated frequency offset of the first set of sidelink shared channel signals.

In some examples, the interference manager 1515 may cancel at least a portion of frequency leakage in the first plurality of sidelink channel signals received within the first set of subcarriers of the subframe from at least one of the second set of sidelink control channel signals or the second set of sidelink shared channel signals.

In some examples, the interference manager 1515 may identify that the interfering signal is a compound of the at least one of the second set of sidelink control channel signals or second set of sidelink shared channel signals and at least one of a synchronization signal, a feedback signal, or a channel state information reference signal.

The coding manager 1520 may decode the first set of sidelink shared channel signals after the interference canceling procedure.

In some examples, the coding manager 1520 may decode the first set of sidelink control channel signals as first decoded sidelink control channel signals and the second set of sidelink control channel signals as second decoded sidelink control channel signals, where the determining is based on the first decoded sidelink control channel signals and the second decoded sidelink control channel signals.

In some examples, the coding manager 1520 may re-encode the interfering signal, where the interference canceling procedure uses the re-encoded interfering signal to cancel at least the portion of the interfering signal portion on one or more subcarriers in the second set of subcarriers that are within the first set of subcarriers of the subframe.

The frequency manager 1525 may identify that the first plurality of sidelink shared channel signals received within the first set of subcarriers and the second plurality of sidelink control channel signals or the second plurality of sidelink shared channel signals received within the second set of subcarriers are within a threshold frequency offset of each other.

In some examples, the frequency manager 1525 may identify that the first plurality of sidelink shared channel signals received within the first set of subcarriers and the second plurality of sidelink control channel signals or the second plurality of sidelink shared channel signals received within the second set of subcarriers are adjacent to each other.

In some examples, the frequency manager 1525 may identify relative frequency domain positions of the first plurality of sidelink shared channel signals that are received within the first set of subcarriers and the second plurality of sidelink control channel signals or the second plurality of sidelink shared channel signals received within the second set of subcarriers.

The error manager 1530 may verify that each of the first set of sidelink control channel signals and the second set of sidelink control channel signals passes a cyclic redundancy check.

Figure 16:
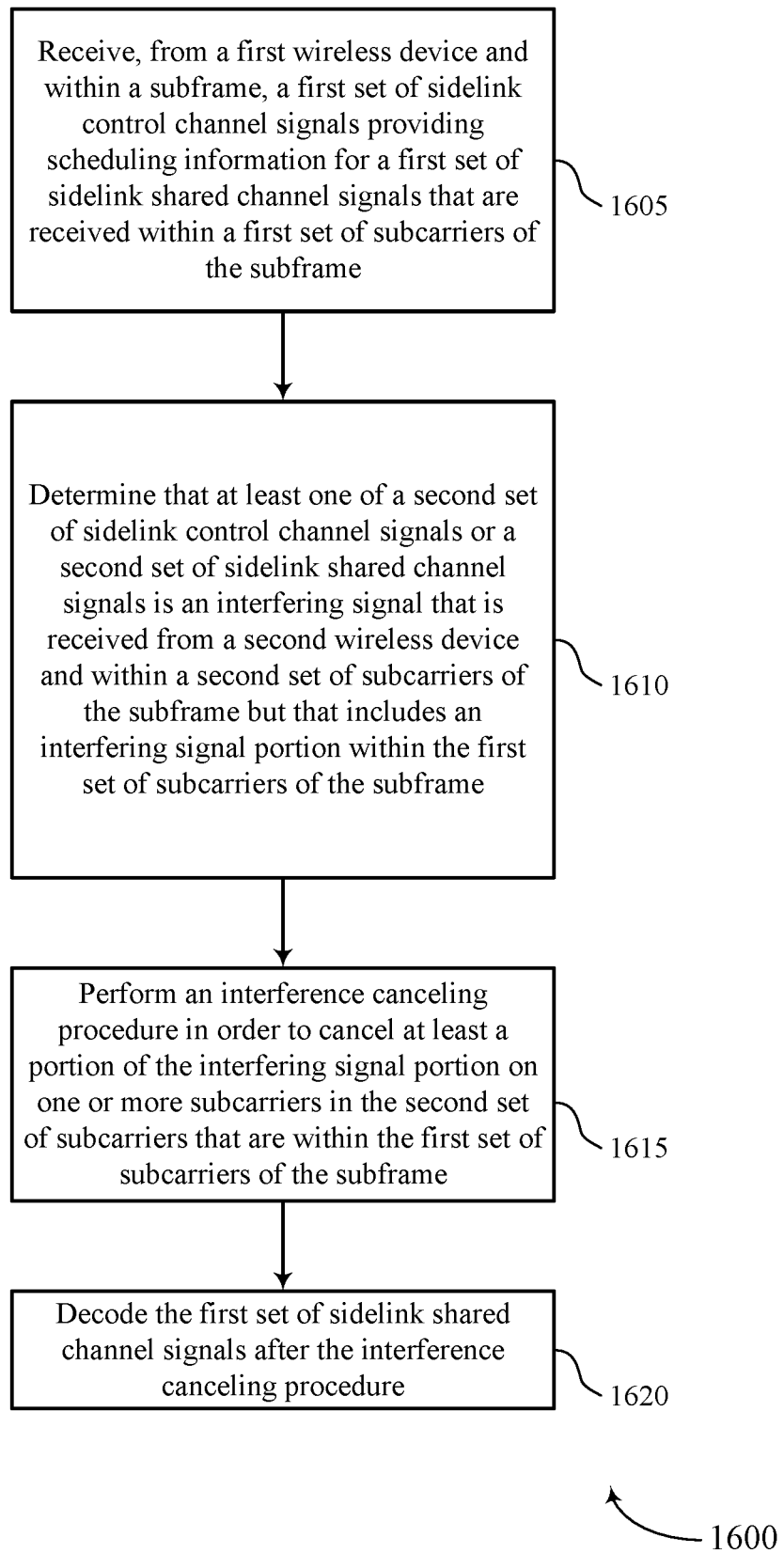
FIGS. 16 and 17 show flowcharts illustrating methods that support sidelink shared channel successive leakage cancellation in accordance with aspects of the present disclosure.

FIG. 16 shows a flowchart illustrating a method 1600 that supports sidelink shared channel successive leakage cancellation in accordance with aspects of the present disclosure. The operations of method 1600 may be implemented by a UE 115 or its components as described herein. For example, the operations of method 1600 may be performed by a communications manager as described with reference to FIGS. 5 through 8 and 14 and 15. In some examples, a UE may execute a set of instructions to control the functional elements of the UE to perform the functions described below. Additionally or alternatively, a UE may perform aspects of the functions described below using special-purpose hardware.

At 1605, the UE may receive, from a first wireless device and within a subframe, a first set of sidelink control channel signals providing scheduling information for a first set of sidelink shared channel signals that are received within a first set of subcarriers of the subframe. The operations of 1605 may be performed according to the methods described herein. In some examples, aspects of the operations of 1605 may be performed by a sidelink channel manager as described with reference to FIGS. 14 and 15.

At 1610, the UE may determine that at least one of a second set of sidelink control channel signals or a second set of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers. The operations of 1610 may be performed according to the methods described herein. In some examples, aspects of the operations of 1610 may be performed by an interference manager as described with reference to FIGS. 14 and 15.

At 1615, the UE may perform an interference canceling procedure in order to cancel at least a portion of the interfering signal portion on one or more subcarriers in the second set of subcarriers that are within the first set of subcarriers of the subframe. The operations of 1615 may be performed according to the methods described herein. In some examples, aspects of the operations of 1615 may be performed by an interference manager as described with reference to FIGS. 14 and 15.

At 1620, the UE may decode the first set of sidelink shared channel signals after the interference canceling procedure. The operations of 1620 may be performed according to the methods described herein. In some examples, aspects of the operations of 1620 may be performed by a coding manager as described with reference to FIGS. 14 and 15.

Figure 17:
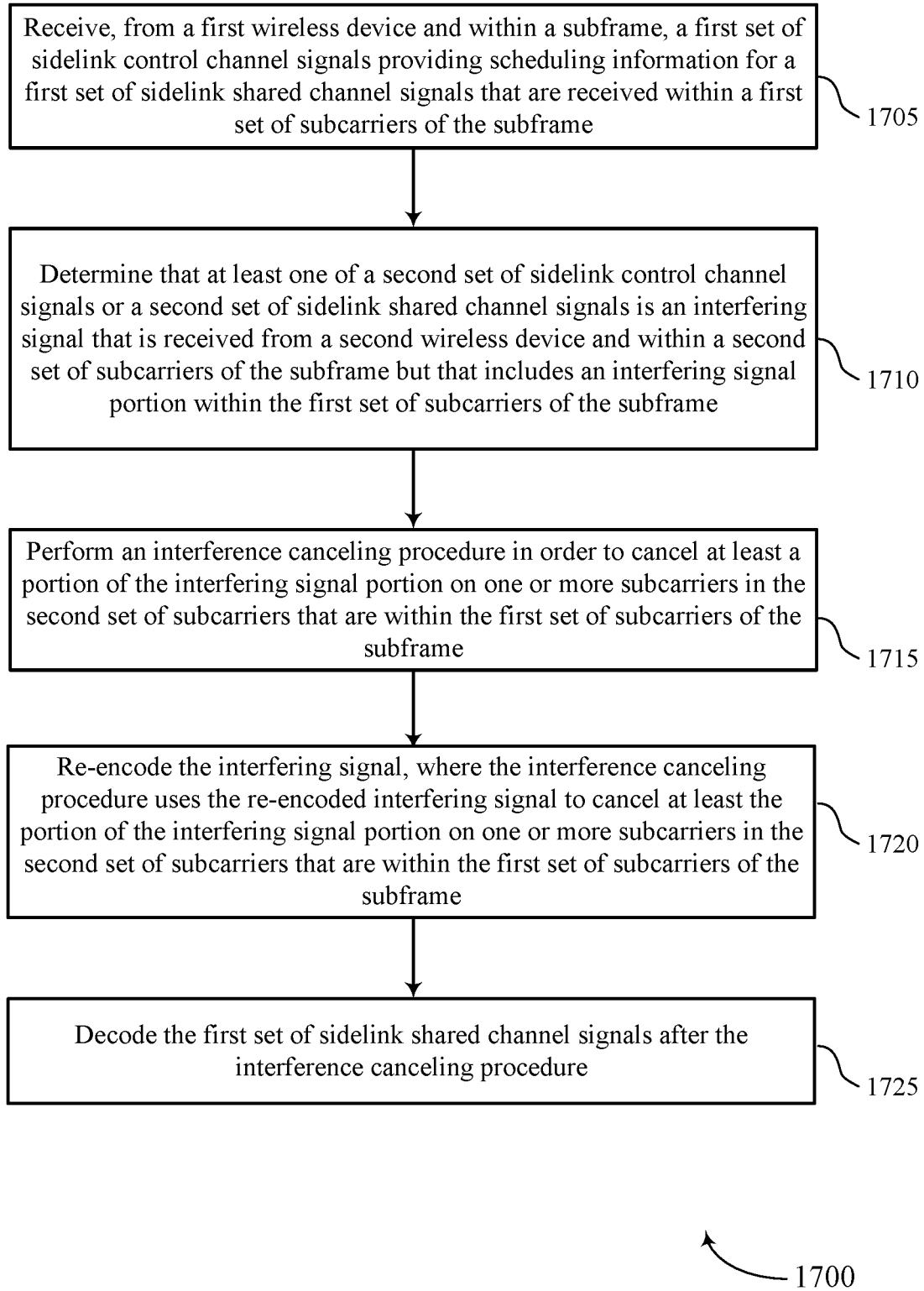

FIG. 17 shows a flowchart illustrating a method 1700 that supports sidelink shared channel successive leakage cancellation in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may receive, from a first wireless device and within a subframe, a first set of sidelink control channel signals providing scheduling information for a first set of sidelink shared channel signals that are received within a first set of subcarriers of the subframe. The operations of 1705 may be performed according to the methods described herein. In some examples, aspects of the operations of 1705 may be performed by a sidelink channel manager as described with reference to FIGS. 14 and 15.

At 1710, the UE may determine that at least one of a second set of sidelink control channel signals or a second set of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers. The operations of 1710 may be performed according to the methods described herein. In some examples, aspects of the operations of 1710 may be performed by an interference manager as described with reference to FIGS. 14 and 15.

At 1715, the UE may perform an interference canceling procedure in order to cancel at least a portion of the interfering signal portion on one or more subcarriers in the second set of subcarriers that are within the first set of subcarriers of the subframe. The operations of 1715 may be performed according to the methods described herein. In some examples, aspects of the operations of 1715 may be performed by an interference manager as described with reference to FIGS. 14 and 15.

At 1720, the UE may re-encode the interfering signal, where the interference canceling procedure uses the re-encoded interfering signal to cancel at least the portion of the interfering signal portion on the one or more subcarriers in the second set of subcarriers that are within the first set of subcarriers of the subframe. The operations of 1720 may be performed according to the methods described herein. In some examples, aspects of the operations of 1720 may be performed by a coding manager as described with reference to FIGS. 14 and 15.

At 1725, the UE may decode the first set of sidelink shared channel signals after the interference canceling procedure. The operations of 1725 may be performed according to the methods described herein. In some examples, aspects of the operations of 1725 may be performed by a coding manager as described with reference to FIGS. 14 and 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive, from a first wireless device and within a subframe, a first plurality of sidelink control channel signals providing scheduling information for a first plurality of sidelink shared channel signals that are received within a first set of subcarriers of the subframe;
determine that at least one of a second plurality of sidelink control channel signals or a second plurality of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers;
perform an interference canceling procedure in order to cancel at least a portion of the interfering signal portion on one or more subcarriers in the second set of subcarriers that are within the first set of subcarriers of the subframe; and
decode the first plurality of sidelink shared channel signals after the interference canceling procedure.

2. The UE of claim 1, wherein the one or more processors are individually or collectively further operable to execute the code to cause the UE to:
decode the first plurality of sidelink control channel signals as first decoded sidelink control channel signals and the second plurality of sidelink control channel signals as second decoded sidelink control channel signals;
determine that the at least one of the second plurality of sidelink control channel signals or the second plurality of sidelink shared channel signals is an interfering signal based at least in part on the first decoded sidelink control channel signals and the second decoded sidelink control channel signals.

3. The UE of claim 2, wherein the one or more processors are individually or collectively further operable to execute the code to cause the UE to:
identify that the interfering signal portion of the one or more subcarriers in the second plurality of sidelink control channel signals or second plurality of sidelink shared channel signals exceeds a predetermined signal strength threshold within first set of subcarriers associated with the first plurality of sidelink shared channel signals.

4. The UE of claim 2, wherein the one or more processors are individually or collectively further operable to execute the code to cause the UE to:
identify that the first plurality of sidelink shared channel signals received within the first set of subcarriers and the second plurality of sidelink control channel signals or the second plurality of sidelink shared channel signals received within the second set of sub carriers are within a threshold frequency offset of each other.

5. The UE of claim 2, wherein the one or more processors are individually or collectively further operable to execute the code to cause the UE to:
identify that the first plurality of sidelink shared channel signals received within the first set of subcarriers and the second plurality of sidelink control channel signals or the second plurality of sidelink shared channel signals received within the second set of subcarriers are adjacent to each other.

6. The UE of claim 2, wherein the one or more processors are individually or collectively further operable to execute the code to cause the UE to:
identify relative frequency domain positions of the first plurality of sidelink shared channel signals received within the first set of subcarriers and the second plurality of sidelink control channel signals or the second plurality of sidelink shared channel signals received within the second set of subcarriers.

7. The UE of claim 2, wherein the one or more processors are individually or collectively further operable to execute the code to cause the UE to:
identify at least one of a modulation and coding scheme, a retransmission policy, or an allocation size and position of the first plurality of sidelink shared channel signals from the first decoded sidelink control channel signals; and
determine that the first plurality of sidelink shared channel signals is subject to interference by the at least one of the second plurality of sidelink control channel signals or second plurality of sidelink shared channel signals based at least in part on the modulation and coding scheme, the retransmission policy, or the allocation size and position of the first plurality of sidelink shared channel signals.

8. The UE of claim 2, wherein the one or more processors are individually or collectively further operable to execute the code to cause the UE to:
determine at least one of an estimated received power, an estimated signal-to-noise ratio, or an estimated frequency offset of the first plurality of sidelink shared channel signals based at least in part on a corresponding measured received power, a corresponding measured signal-to-noise ratio, or a corresponding measured frequency offset of the first decoded sidelink control channel signals; and
determine that the first plurality of sidelink shared channel signals is subject to interference by the at least one of the second plurality of sidelink control channel signals or second plurality of sidelink shared channel signals based at least in part on the estimated received power, the estimated signal-to-noise ratio, or the estimated frequency offset of the first plurality of sidelink shared channel signals.

9. The UE of claim 2, wherein, to decode the first plurality of sidelink control channel signals and the second plurality of sidelink control channel signals, the one or more processors are individually or collectively further operable to execute the code to cause the UE to:
verify that each of the first plurality of sidelink control channel signals and the second plurality of sidelink control channel signals passes a cyclic redundancy check.

10. The UE of claim 1, wherein, to perform the interference canceling procedure, the one or more processors are individually or collectively further operable to execute the code to cause the UE to:
re-encode the interfering signal, wherein the interference canceling procedure uses the re-encoded interfering signal to cancel at least the portion of the interfering signal portion within the first set of subcarriers of the subframe.

11. The UE of claim 1, wherein, to perform the interference canceling procedure, the one or more processors are individually or collectively further operable to execute the code to cause the UE to:
cancel at least a portion of frequency leakage in the first plurality of sidelink shared channel signals received within the first set of subcarriers of the subframe from at least one of the second plurality of sidelink control channel signals or the second plurality of sidelink shared channel signals.

12. The UE of claim 1, wherein the one or more processors are individually or collectively further operable to execute the code to cause the UE to:
identify that the interfering signal is a compound of the at least one of the second plurality of sidelink control channel signals or second plurality of sidelink shared channel signals and at least one of a synchronization signal, a feedback signal, or a channel state information reference signal.

13. The UE of claim 1, wherein the first plurality of sidelink control channel signals, the first plurality of sidelink shared channel signals, the second plurality of sidelink control channel signals, and the second plurality of sidelink shared channel signals are cellular vehicle-to-everything (CV2X) signals.

14. The UE of claim 1, wherein the first plurality of sidelink control channel signals and the second plurality of sidelink control channel signals are physical sidelink control channel (PSCCH) signals and the first plurality of sidelink shared channel signals and the second plurality of sidelink shared channel signals are physical sidelink shared channel (PSSCH) signals.

15. A method for wireless communication at a user equipment (UE), comprising:
receiving, from a first wireless device and within a subframe, a first plurality of sidelink control channel signals providing scheduling information for a first plurality of sidelink shared channel signals that are received within a first set of subcarriers of the subframe;
determining that at least one of a second plurality of sidelink control channel signals or a second plurality of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers;
performing an interference canceling procedure in order to cancel at least a portion of the interfering signal portion on one or more subcarriers in the second set of subcarriers that are within the first set of subcarriers of the subframe; and
decoding the first plurality of sidelink shared channel signals after the interference canceling procedure.

16. The method of claim 15, wherein determining that at least one of the second plurality of sidelink control channel signals or the second plurality of sidelink shared channel signals is an interfering signal comprises:
decoding the first plurality of sidelink control channel signals as first decoded sidelink control channel signals and the second plurality of sidelink control channel signals as second decoded sidelink control channel signals, wherein the determining is based at least in part on the first decoded sidelink control channel signals and the second decoded sidelink control channel signals.

17. The method of claim 16, wherein determining that at least one of the second plurality of sidelink control channel signals or the second plurality of sidelink shared channel signals is an interfering signal further comprises:
identifying that the interfering signal portion of the one or more subcarriers in the second plurality of sidelink control channel signals or second plurality of sidelink shared channel signals exceeds a predetermined signal strength threshold within first set of subcarriers associated with the first plurality of sidelink shared channel signals.

18. The method of claim 16, wherein determining that at least one of the second plurality of sidelink control channel signals or the second plurality of sidelink shared channel signals is an interfering signal further comprises:
identifying that the first plurality of sidelink shared channel signals received within the first set of subcarriers and the second plurality of sidelink control channel signals or the second plurality of sidelink shared channel signals received within the second set of subcarriers are within a threshold frequency offset of each other.

19. The method of claim 16, wherein determining that at least one of the second plurality of sidelink control channel signals or the second plurality of sidelink shared channel signals is an interfering signal further comprises:
identifying that the first plurality of sidelink shared channel signals received within the first set of subcarriers and the second plurality of sidelink control channel signals or the second plurality of sidelink shared channel signals received within the second set of subcarriers are adjacent to each other.

20. A non-transitory computer-readable medium storing code for wireless communications at a user equipment (UE), the code comprising instructions executable by one or more processors to:
receive, from a first wireless device and within a subframe, a first plurality of sidelink control channel signals providing scheduling information for a first plurality of sidelink shared channel signals that are received within a first set of subcarriers of the subframe;
determine that at least one of a second plurality of sidelink control channel signals or a second plurality of sidelink shared channel signals is an interfering signal that is received from a second wireless device and within a second set of subcarriers of the subframe but that includes an interfering signal portion within the first set of subcarriers of the subframe, the second set of subcarriers being different from the first set of subcarriers;
perform an interference canceling procedure in order to cancel at least a portion of the interfering signal portion on one or more subcarriers in the second set of subcarriers that are within the first set of subcarriers of the subframe; and
decode the first plurality of sidelink shared channel signals after the interference canceling procedure.

* * * * *